US012746105B2

(12) United States Patent
Pellissard et al.

(10) Patent No.: US 12,746,105 B2
(45) Date of Patent: Sep. 29, 2026

(54) ACQUISITION KIT

(71) Applicant: DENTAL MONITORING, Paris (FR)

(72) Inventors: Thomas Pellissard, Maisons-Alfort (FR); Cédric Lancon, Villers Farlay (FR); Louis-Charles Roisin, Paris (FR); Philippe Salah, Paris (FR)

(73) Assignee: DENTAL MONITORING, Paris (FR)

( * ) Notice: Subject to any disclaimer, the term of this patent is extended or adjusted under 35 U.S.C. 154(b) by 199 days.

(21) Appl. No.: 18/277,140

(22) PCT Filed: Feb. 16, 2022

(86) PCT No.: PCT/EP2022/053852
§ 371 (c)(1),
(2) Date: Aug. 14, 2023

(87) PCT Pub. No.: WO2022/175346
PCT Pub. Date: Aug. 25, 2022

(65) Prior Publication Data

US 2024/0122689 A1 Apr. 18, 2024

(30) Foreign Application Priority Data

Feb. 17, 2021 (FR) ....................................... 2101517

(51) Int. Cl.
*A61C 19/04* (2006.01)
*A61C 9/00* (2006.01)
(Continued)

(52) U.S. Cl.
CPC ............ *A61C 19/04* (2013.01); *A61C 9/0053* (2013.01); *G06T 7/0012* (2013.01);
(Continued)

(58) Field of Classification Search
CPC ......... A61C 19/04; A61C 9/0053; A61C 7/00; A61C 9/004; G06T 7/0012;
(Continued)

(56) References Cited

U.S. PATENT DOCUMENTS

| | | | |
|---|---|---|---|
| 6,241,798 | B1 | 6/2001 | Dimitrov et al. |
| 6,923,761 | B1 | 8/2005 | Dorfman |

(Continued)

FOREIGN PATENT DOCUMENTS

| | | | |
|---|---|---|---|
| CH | 677600 | A5 | 6/1991 |
| CN | 212086241 | U | 12/2020 |

(Continued)

OTHER PUBLICATIONS

English translation of patent ch-677600. (Year: 1991).*
(Continued)

*Primary Examiner* — Shahbaz Nazrul
(74) *Attorney, Agent, or Firm* — Ronald M. Kachmarik; Cooper Legal Group LLC

(57) ABSTRACT

An acquisition kit including: a mobile telephone; a mobile telephone holder including: —a spacer opening via an oral aperture, intended to be inserted into the user's mouth, and via an acquisition aperture, and —an adapter fastened to the spacer and defining, with the spacer, a chamber opening via the oral aperture and via an adapter aperture, the adapter including a base to which the mobile telephone is rigidly but removably attached in an acquisition position in which the objective lens of the mobile telephone has an at least partial view of the oral aperture, through the adapter aperture and the acquisition aperture, the oral aperture having a curvature about a vertical axis in the service position, the radius of the curvature being greater than 20 mm and less than 80 mm.

19 Claims, 13 Drawing Sheets

(51) Int. Cl.
*G06T 7/00* (2017.01)
*H04B 1/3877* (2015.01)
*H04M 1/04* (2006.01)

(52) U.S. Cl.
CPC ............ *H04B 1/3877* (2013.01); *H04M 1/04* (2013.01); *G06T 2207/30036* (2013.01)

(58) Field of Classification Search
CPC ....... G06T 2207/30036; H04B 1/3877; H04M 1/04; G03B 15/14; G03B 17/56; G03B 17/566; G01J 3/0202; G01J 3/0262; G01J 3/0272; G01J 3/508; A61B 1/00105; A61B 1/00126; A61B 1/0014; A61B 1/24; A61B 1/32; A61B 1/00059; A61B 5/4547; A61B 5/4552
See application file for complete search history.

(56) References Cited

U.S. PATENT DOCUMENTS

| | | | | |
|---|---|---|---|---|
| 7,912,257 | B2 | 3/2011 | Paley et al. | |
| 9,014,440 | B2 | 4/2015 | Arumugam et al. | |
| 9,152,767 | B2 | 10/2015 | Mah | |
| 9,770,217 | B2 | 9/2017 | Sandholm et al. | |
| 10,032,271 | B2 | 7/2018 | Somasundaram et al. | |
| 10,136,972 | B2 | 11/2018 | Sabina et al. | |
| 10,242,443 | B2 | 3/2019 | Hsieh et al. | |
| 10,463,451 | B2 | 11/2019 | Janzadeh et al. | |
| 10,467,815 | B2 | 11/2019 | Marom et al. | |
| 10,504,386 | B2 | 12/2019 | Levin et al. | |
| 10,588,723 | B2 | 3/2020 | Falkel | |
| 10,660,728 | B2 | 5/2020 | Maraj et al. | |
| 10,736,715 | B2 | 8/2020 | Salah et al. | |
| 10,779,718 | B2 | 9/2020 | Meyer et al. | |
| 10,842,592 | B2 | 11/2020 | Salah et al. | |
| 11,291,532 | B2 | 4/2022 | Azernikov et al. | |
| 11,532,079 | B2 | 12/2022 | Salah et al. | |
| 11,599,997 | B2 | 3/2023 | Salah et al. | |
| 11,638,636 | B2 | 5/2023 | Oren-Artzi et al. | |
| 12,349,871 | B2 * | 7/2025 | Eilat-Bloch | A61C 9/0046 |
| 2004/0209225 | A1 | 10/2004 | Kerrhawe | |
| 2007/0160958 | A1 | 7/2007 | Belikov et al. | |
| 2009/0186655 | A1 | 7/2009 | Wernersson | |
| 2012/0040305 | A1 | 2/2012 | Karazivan et al. | |
| 2012/0172685 | A1 | 7/2012 | Gilbert | |
| 2013/0148273 | A1 | 6/2013 | Tsai | |
| 2013/0209954 | A1 | 8/2013 | Prakash et al. | |
| 2013/0244197 | A1 | 9/2013 | Tjioe et al. | |
| 2014/0005484 | A1 | 1/2014 | Charles | |
| 2014/0339278 | A1 | 11/2014 | Ditore et al. | |
| 2015/0234192 | A1 | 8/2015 | Lyons | |
| 2016/0374784 | A1 | 12/2016 | Joshi | |
| 2017/0258420 | A1 | 9/2017 | Inglese et al. | |
| 2017/0281313 | A1 | 10/2017 | Kim | |
| 2018/0125610 | A1 | 5/2018 | Carrier, Jr. et al. | |
| 2018/0228359 | A1 | 8/2018 | Meyer et al. | |
| 2018/0303580 | A1 | 10/2018 | Salah et al. | |
| 2019/0167115 | A1 | 6/2019 | Dorodvand et al. | |
| 2020/0060623 | A1 | 2/2020 | Sayani et al. | |
| 2020/0315434 | A1 | 10/2020 | Kopelman et al. | |
| 2020/0334813 | A1 | 10/2020 | Salah et al. | |
| 2020/0397273 | A1 | 12/2020 | Meyer et al. | |
| 2021/0068923 | A1 | 3/2021 | Carrier, Jr. et al. | |
| 2021/0282634 | A1 * | 9/2021 | Oren-Artzi | A61B 1/042 |
| 2022/0338723 | A1 * | 10/2022 | Farkash | A61B 1/053 |

FOREIGN PATENT DOCUMENTS

| | | | |
|---|---|---|---|
| EP | 16183461.9 | | 8/2016 |
| EP | 3496592 | A1 | 6/2019 |
| EP | 3714764 | A1 | 9/2020 |
| FR | 3004098 | B1 | 7/2019 |
| GB | 2438662 | A | 12/2007 |
| JP | 4576325 | B2 | 11/2010 |
| JP | 2017031794 | A | 2/2017 |
| JP | 2018134418 | A | 8/2018 |
| KR | 101583547 | B1 | 1/2016 |
| KR | 101584737 | B1 | 1/2016 |
| WO | 2016/066637 | A1 | 5/2016 |
| WO | 2016/066642 | A1 | 5/2016 |
| WO | 2016/066650 | A1 | 5/2016 |
| WO | 2016/066651 | A1 | 5/2016 |
| WO | 2016/066652 | A1 | 5/2016 |
| WO | 2016/066654 | A1 | 5/2016 |
| WO | 2016185463 | A1 | 11/2016 |
| WO | 2017105392 | A1 | 6/2017 |
| WO | 2018/029276 | A1 | 2/2018 |
| WO | 2020/089248 | A1 | 5/2020 |
| WO | 2021/058930 | A1 | 4/2021 |
| WO | 2021173867 | A1 | 9/2021 |
| WO | 2022/008533 | A1 | 1/2022 |

OTHER PUBLICATIONS

International Search Report corresponding to International Application No. PCT/EP2022/053852 dated May 11, 2022, 6 pages.
Kevis-Kokitsi Maninis et al. "Convolutional Oriented Boundaries: From Image Segmentation to High-Level Tasks," GRIN-DE00135889, Apr. 28, 2017.
Kevis-Kokitsi Maninis et al. "Convolutional Oriented Boundaries: From Image Segmentation to High-Level Tasks," GRIN-DE00135889, Jan. 17, 2017.
*CS Dental Monitoring SAS* v. *Align Technology, Inc.*, Order re Summary Judgment, No. C22-07335 WHA (NDCA, May 16, 2024).
Written Opinion for International Patent Application No. PCT/EP2015/074868 (Feb. 24, 2016).
Written Opinion for International Patent Application No. PCT/EP2015/074895 (Jan. 7, 2016).
Written Opinion for International Patent Application No. PCT/EP2015/074896 (Jan. 12, 2016).
Written Opinion for International Patent Application No. PCT/EP2015/074897 (Jan. 26, 2016).
Written Opinion for International Patent Application No. PCT/EP2019/079565 (Dec. 16, 2019).
International Preliminary Report on Patentability for International Patent Application No. PCT/EP2021/068702 (Jan. 10, 2023).
International Search Report for International Patent Application No. PCT/EP2015/074896 (Dec. 17, 2015).
International Search Report for International Patent Application No. PCT/EP2015/074900 (Dec. 17, 2015).
International Search Report for International Patent Application No. PCT/EP2015/074859 (Dec. 17, 2015).
International Search Report for International Patent Application No. PCT/EP2015/074868 (Dec. 12, 2015).
International Search Report for International Patent Application No. PCT/EP2015/074895 (Dec. 17, 2015).
International Search Report for International Patent Application No. PCT/EP2019/079565 (Dec. 16, 2019).
Prosecution History of the U.S. Pat. No. 11,532,079 to Salah et. Al.
Prosecution History of the U.S. Pat. No. 11,599,997 to Salah et. Al.
Declaration of Chandrajit Bajaj, Ph.D., Under 37 C.F.R. § 1.132.
Complaint for Patent Infringement, *Dental Monitoring* v. *Get-Grin Inc.*, Case No. 1-23-cv-00432 (DDE).
Joint Claim Construction Brief, *Dental Monitoring* v. *Get-Grin Inc.*, Case No. 1-22-cv00647 (DDE).
Byju's Math, Cross Sections of Cylinders, available at https://byjus.com/us/math/cross-sections-of-cylinders/.
Certified English Translation of Japanese Publication JP4576325 B2 to Kenji et al.
U.S. Appl. No. 62/417,985 to Carrier, Jr. et al.
"Integral," Merriam-Webster's Collegiate Dictionary (Excerpt), 11th Edition; 2004.

* cited by examiner

[Fig 1]
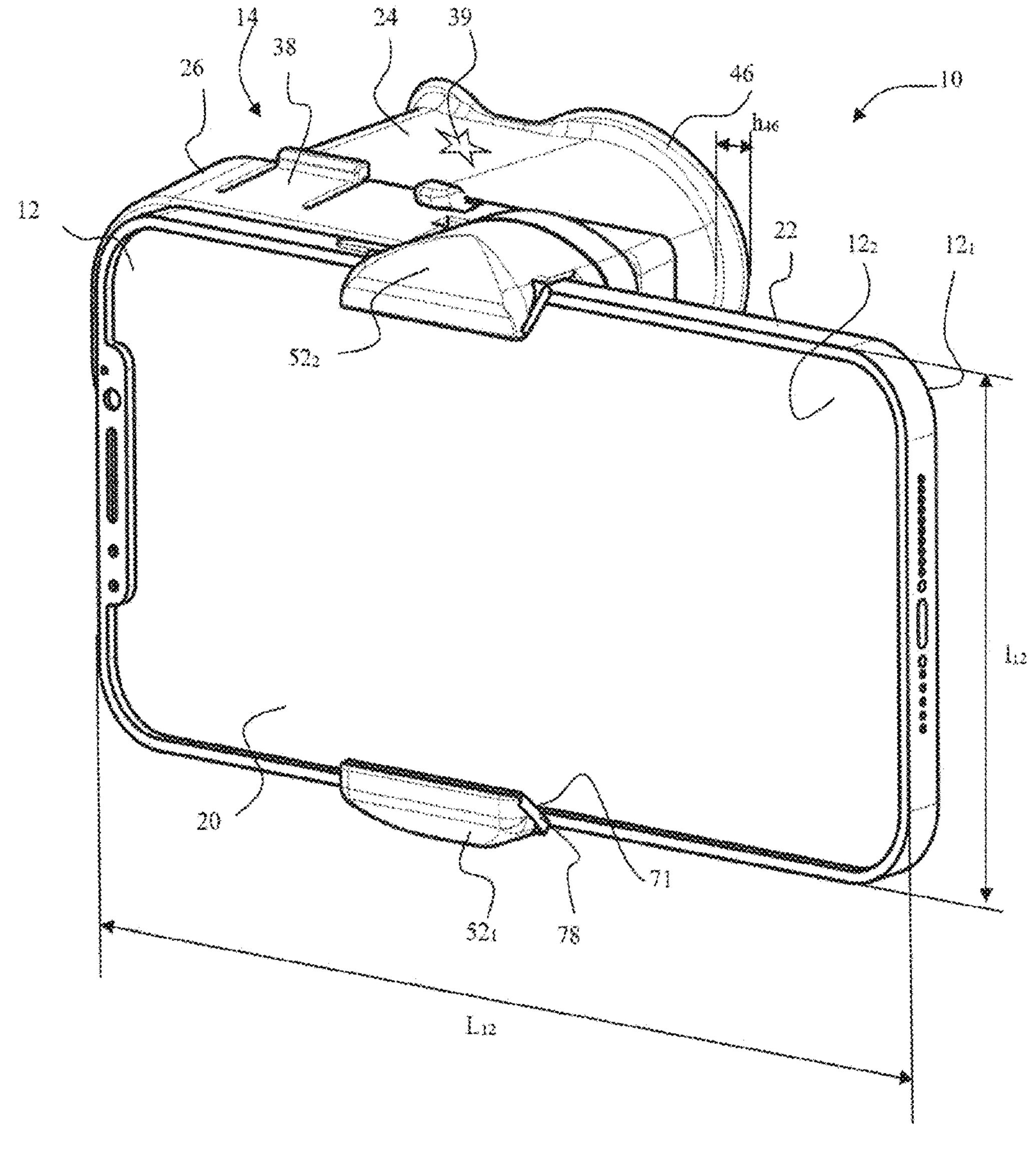

[Fig 2]
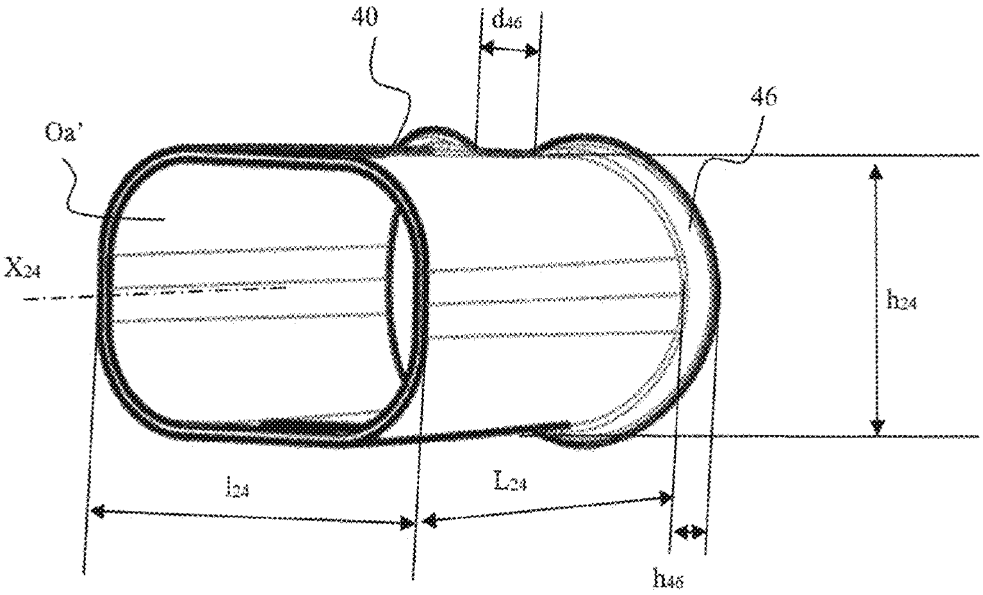

[Fig 3]
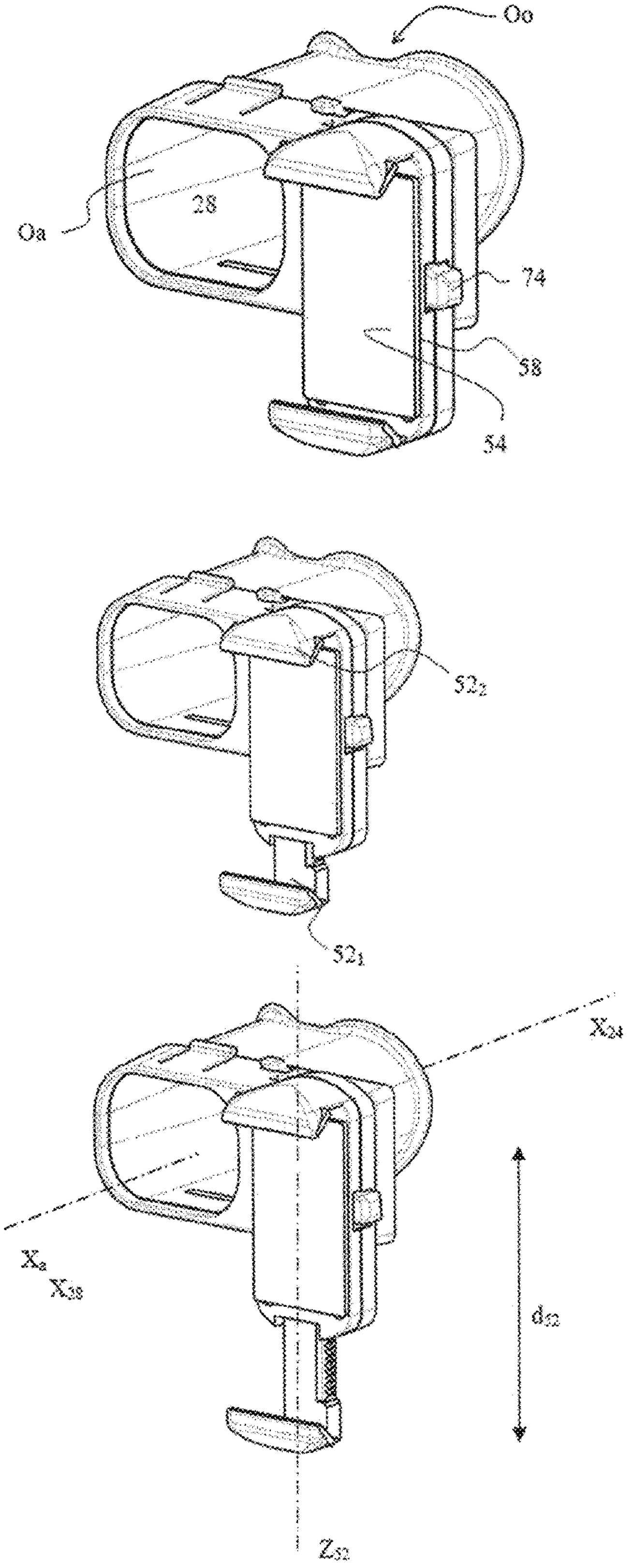
3A
3B
3C

[Fig 4]
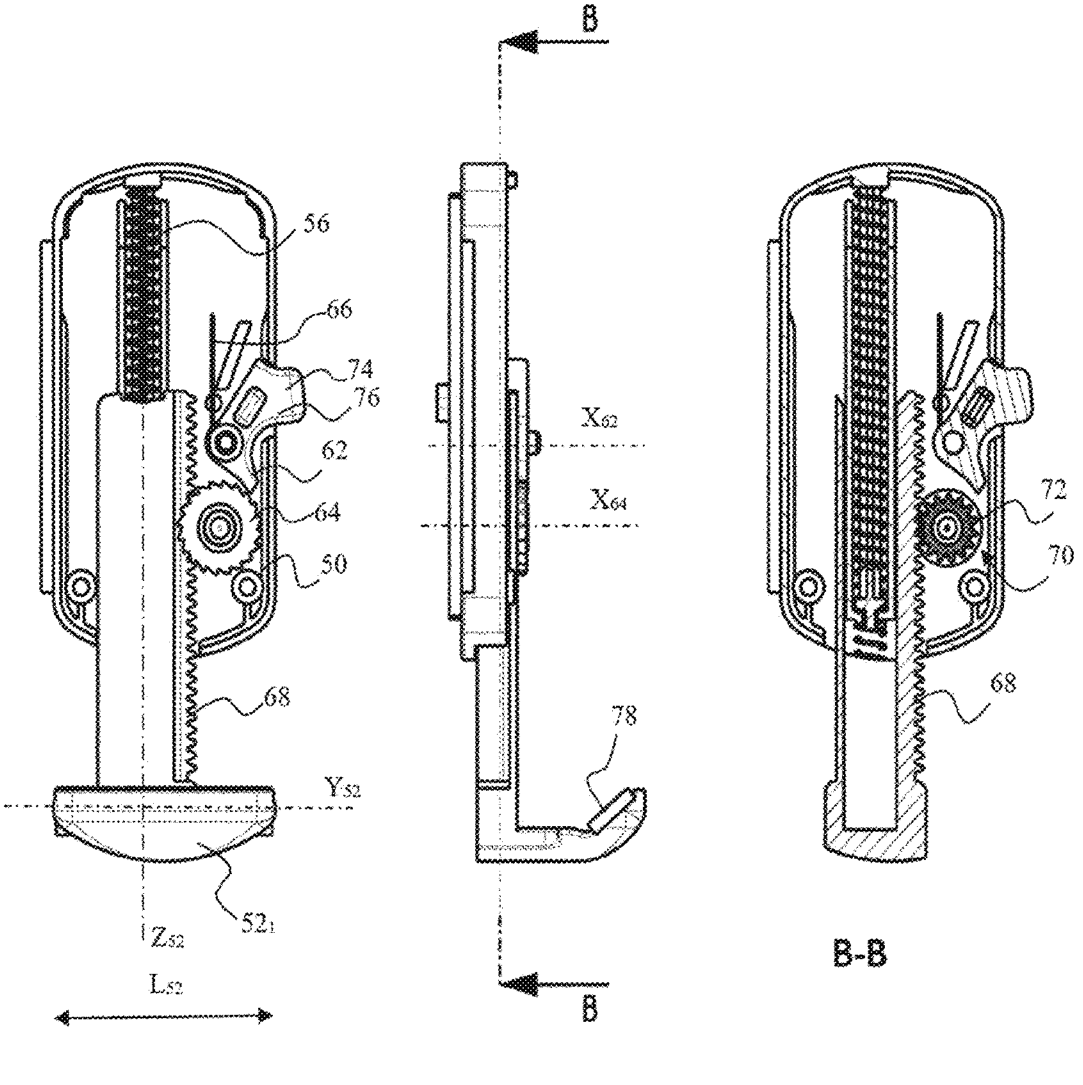
4A 4B 4C

[Fig 5]
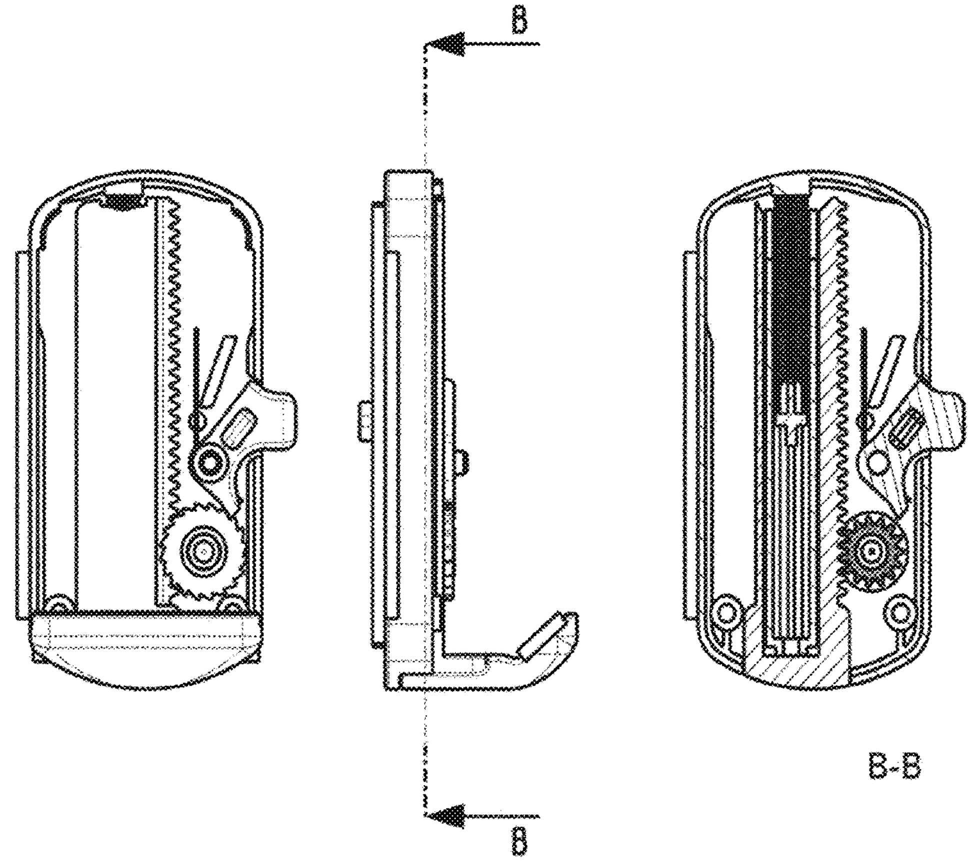
5A 5B 5C

[Fig 6]
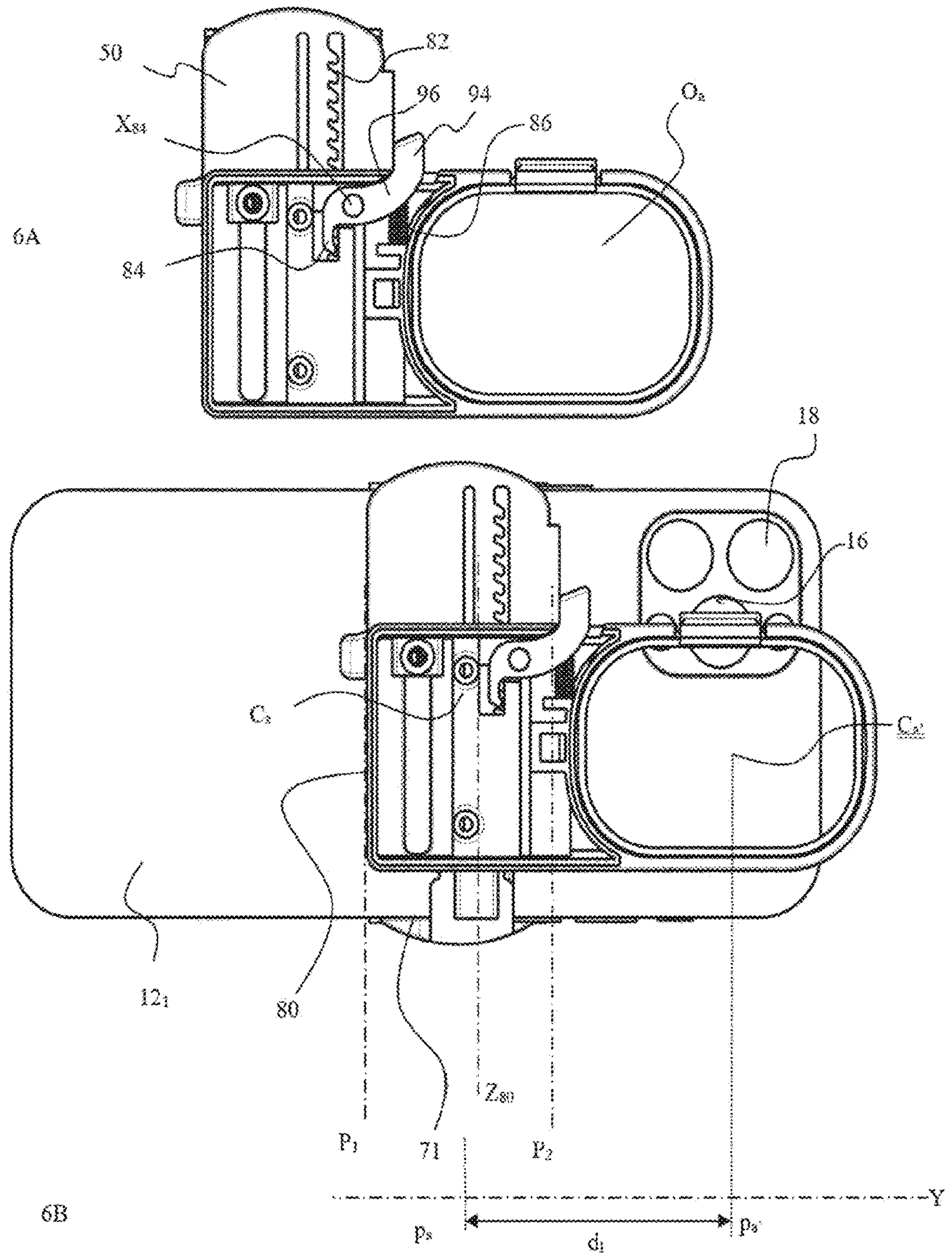

[Fig 7]
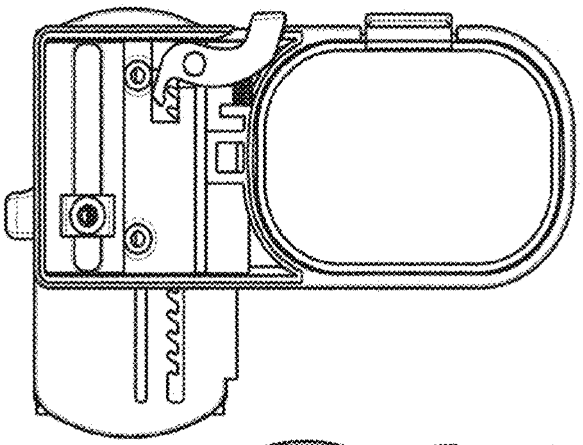
7A
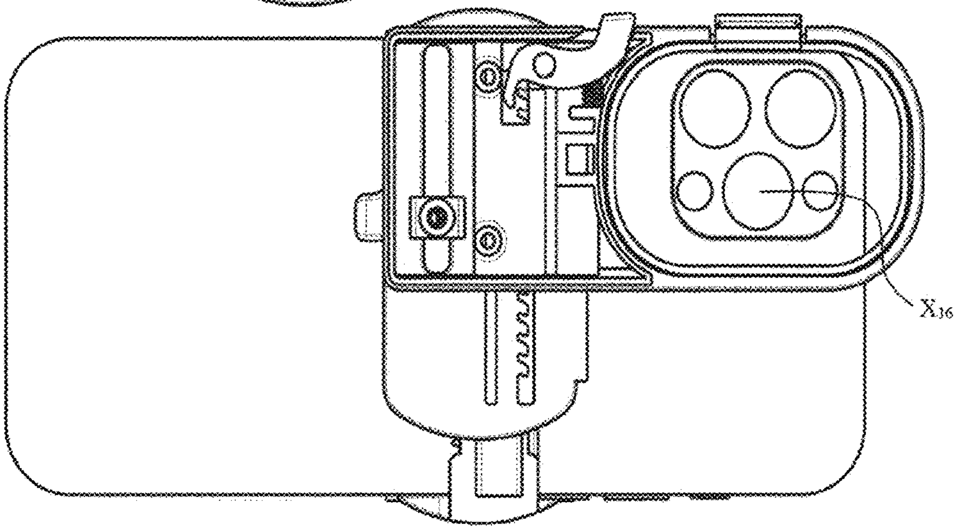
7B

[Fig 8]
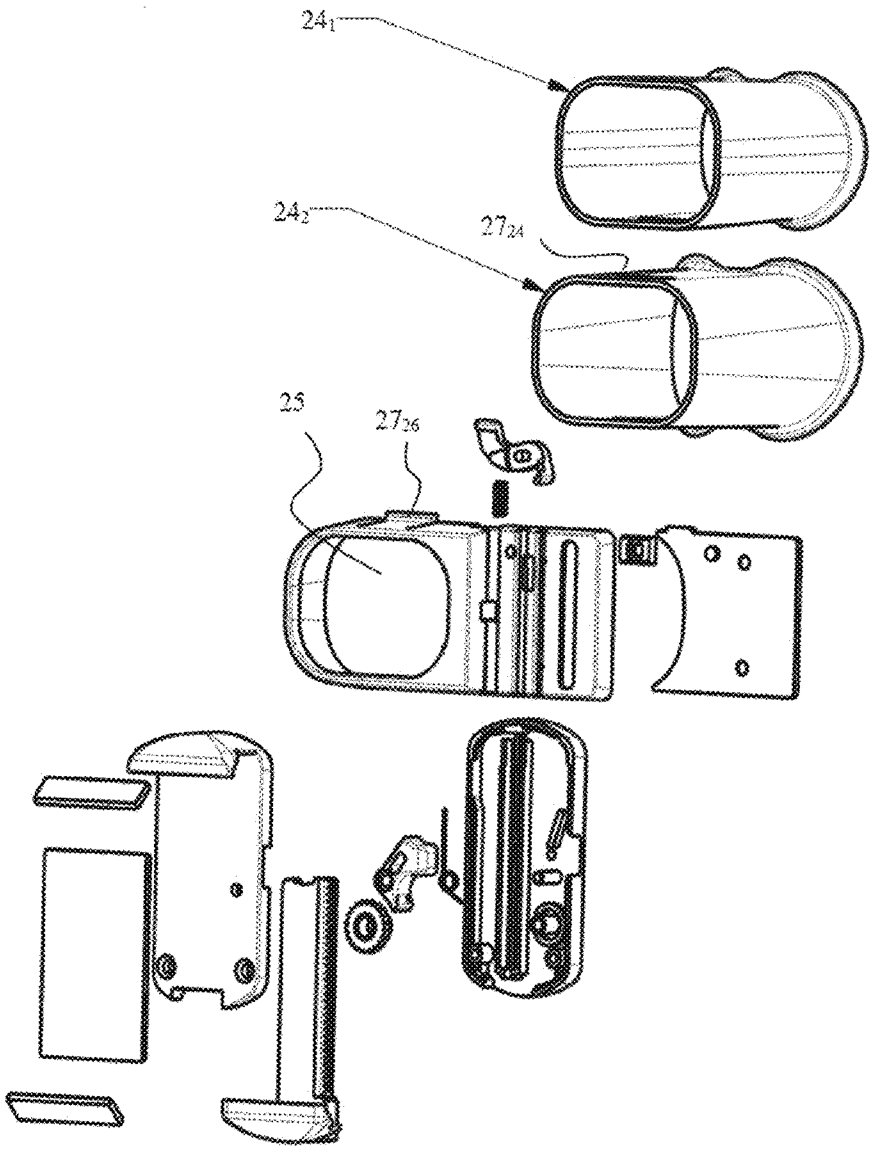

[Fig 9]
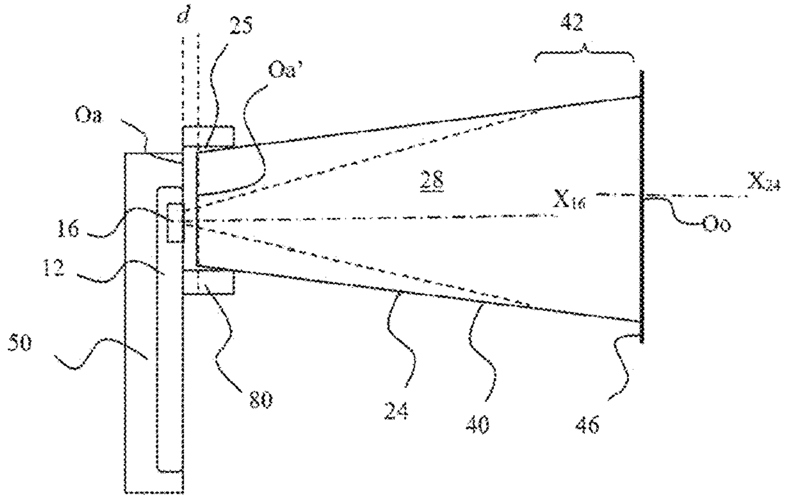
[Fig 10]
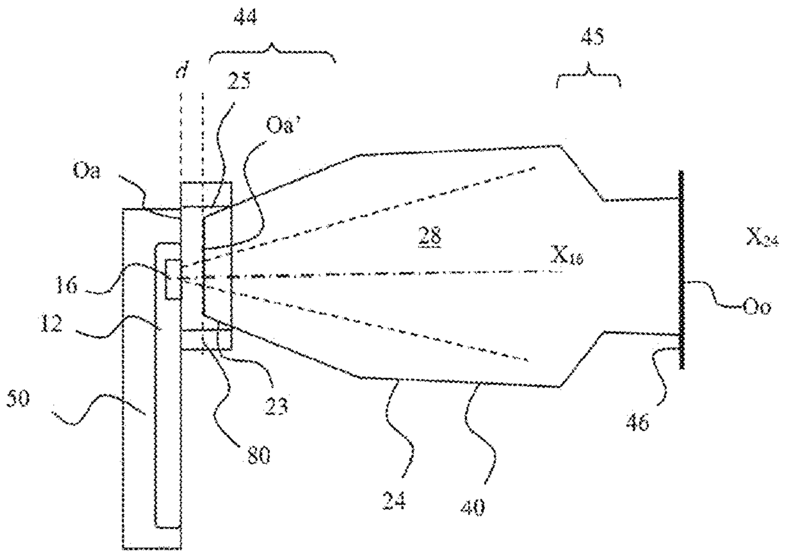

[Fig 11]
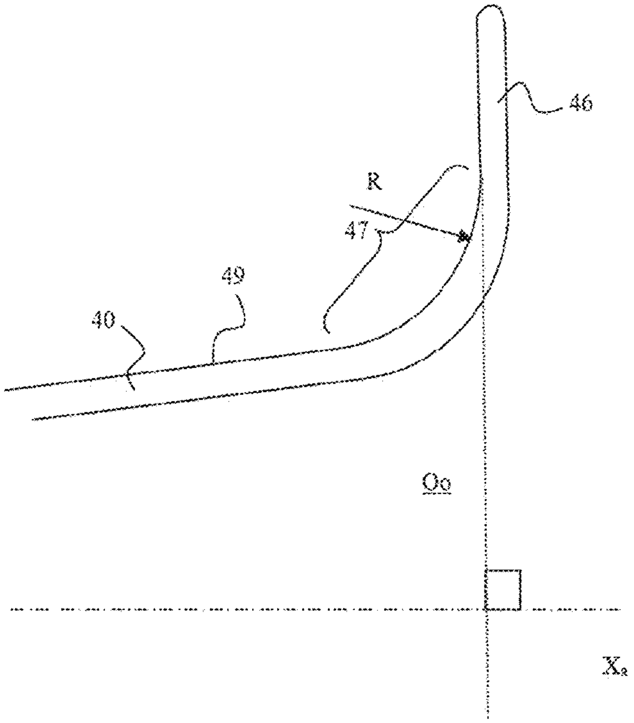

[Fig 12]
12A
12B

[Fig 13]
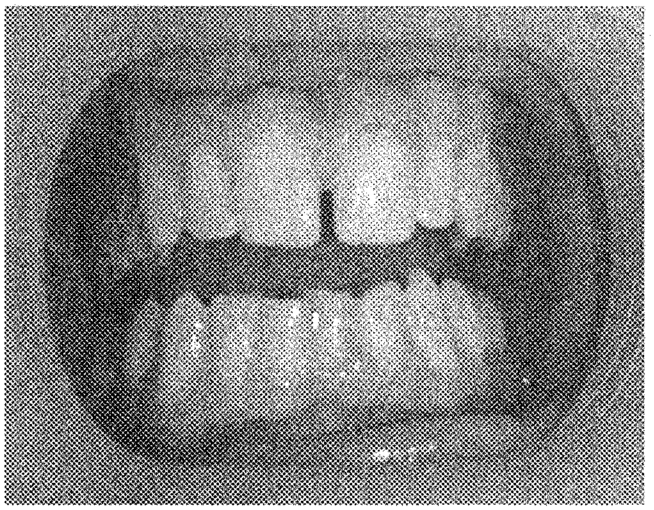
[Fig 14]
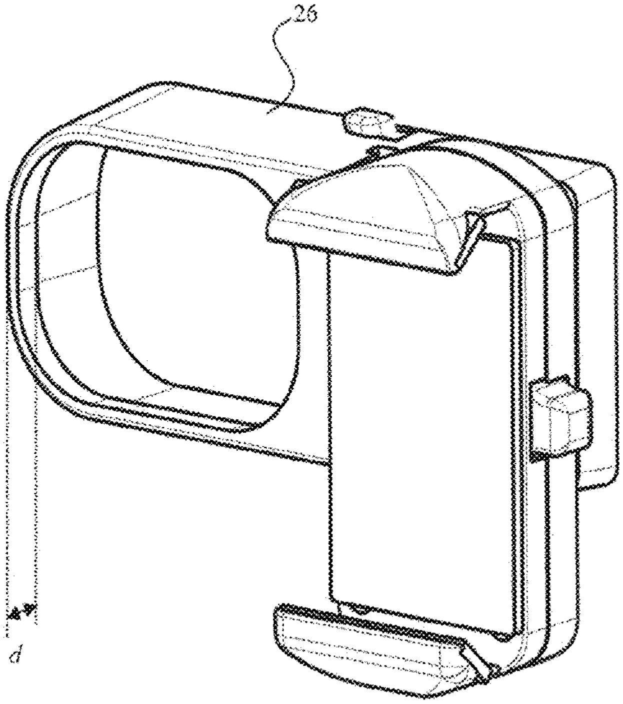

[Fig 15]
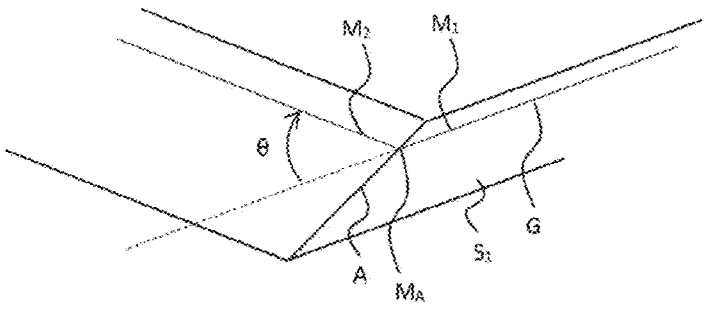
[Fig 16]
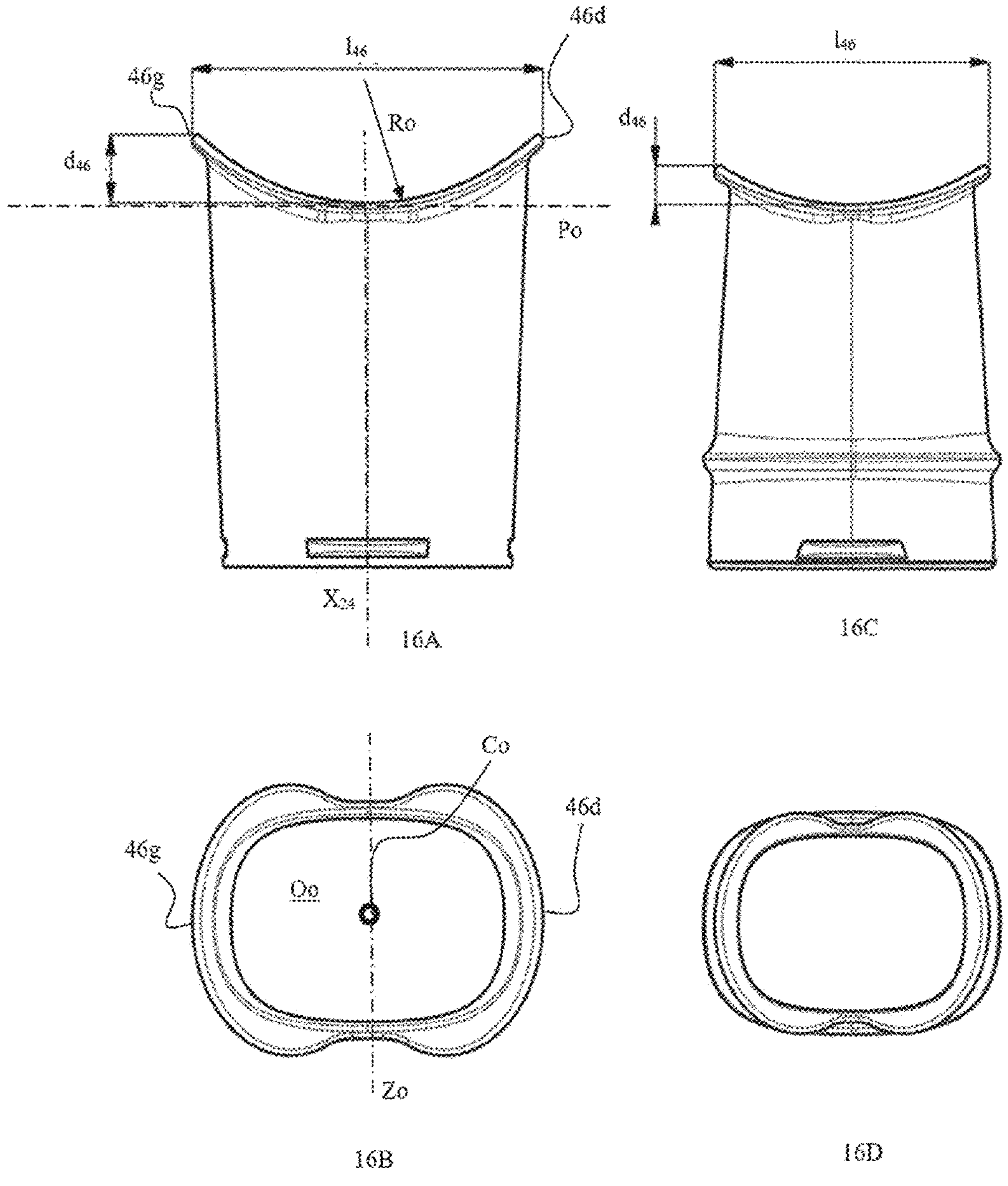

ACQUISITION KIT

TECHNICAL FIELD

The present invention relates to an acquisition kit, and in particular a kit for acquiring dental photos, in particular for the implementation of a method as described in international application PCT/EP2015/074896.

PRIOR ART

PCT/EP2015/074897 describes an acquisition kit for acquiring, by means of a cell phone, extraoral photos of the teeth of a user, with their mouth closed or open.

There is a continuing need for an acquisition kit which is
- compact,
- inexpensive to produce,
- preferably reusable,
- easy to handle and place in the service position in the user's mouth,
- and which allows, using the cell phone, 2D or 3D data to be easily acquired by the user themselves, in occlusal or lateral views, with their mouth open or closed, in optimal hygienic conditions.

The 2D or 3D data, relating to the teeth, may in particular be extraoral images or three-dimensional digital models.

The kit must allow the acquisition of data for each tooth of the user, and in particular teeth at the back of the mouth.

An aim of the present invention is to meet this need, at least partially.

SUMMARY OF THE INVENTION

The invention proposes an acquisition kit comprising:
- a cell phone having
  - a front face,
  - a rear face with a screen, and
  - a side edge, defining the thickness of the cell phone and connecting the front and rear faces;
- the cell phone being provided with a 2D and/or 3D data acquisition lens, preferably positioned on the front face;
- a cell phone holder comprising
  - a spacer, opening out through an oral opening intended to be inserted in the mouth of the user and through an acquisition opening, and
  - an adapter, preferably of generally tubular shape, attached to the spacer and defining with the spacer a chamber opening out through the oral opening and through an adapter opening, wherein the adapter opening may be coincident with the acquisition opening, the adapter comprising a base to which the cell phone is rigidly attached, preferably removably, in an acquisition position in which the lens has an at least partial view of the oral opening, through the adapter opening and the acquisition opening.

After several years of research, the inventors have discovered many advantageous features of such an acquisition kit.

Such an acquisition kit may in particular include one or more of the following preferred features:

According to a first main aspect, particularly advantageous for improving the interface with the user:
- the cell phone is attached to the base in such a way that less than 20%, preferably less than 15%, preferably less than 10%, preferably less than 5%, preferably less than 2% of the area of the rear face is concealed by the adapter;
- the rear face of the cell phone is not in contact with the adapter or the area of the contact surface between the rear face of the cell phone and the adapter represents less than 40%, preferably less than 30%, preferably less than 20%, preferably less than 10%, preferably less than 5% of the area of said rear face;
- the cell phone is clamped in a clamping direction, preferably clamped perpendicularly to the direction of the length or the width of the cell phone, preferably parallel to the front face of the cell phone, against the base of the adapter;
- the cell phone is clamped against the base at a plurality of clamping points, the greatest distance between clamping points, measured perpendicular to the clamping direction, preferably measured in the direction of the length of the cell phone, being greater than 1 cm, preferably greater than 2 cm, preferably greater than 3 cm, preferably greater than 4 cm, and/or less than 10 cm;
- the adapter comprises at least one strap, preferably elastic, and/or at least one first jaw pressing the cell phone against the base;
- the adapter opening is laterally offset with respect to the clamping zone in which the cell phone is clamped to the adapter,
- a lateral offset being a non-zero distance, in an offset direction perpendicular to the clamping direction and in a plane parallel to the plane of the front face of the cell phone, between the position of the center of the adapter opening and the position of the center of the clamping zone;
- the lateral offset is greater than 3 cm and less than 10 cm.

According to a second main aspect, particularly advantageous for the assembly of the cell phone:
- the adapter, in particular the base, comprises first and second jaws between which the cell phone is clamped, in a clamping direction;
- the clamping direction is preferably perpendicular to the direction of the length of the cell phone and/or perpendicular to the direction of the width of the cell phone and/or along a diagonal connecting two corners of the cell phone;
- the adapter does not have any stops limiting movement perpendicular to the clamping direction;
- the first jaw and/or the second jaw has/have the shape of a cradle receiving the side edge of the cell phone;
- the first jaw and/or the second jaw is/are movable on the base incrementally;
- the adapter includes:
  - a first deactivatable non-return system preventing a movement of the first jaw and/or of the second jaw away from the cell phone, referred to as a "separation movement", and
  - an elastic member, for example a spring, acting on the first jaw and/or the second jaw, respectively, in such a way as to produce a said separation movement;
- the first non-return system comprises:
  - a ratchet wheel mechanically coupled to the first jaw and/or the second jaw such that rotation of the ratchet wheel causes the first jaw and/or the second jaw to move relative to the base,
  - a first deactivatable pawl, engaged in the ratchet wheel, and a first elastic member, for example a spring, elastically pushing the first pawl against the ratchet wheel;

the first jaw and/or the second jaw comprise(s) a first rack, and the adapter comprises a stepped wheel rotatably mounted on the base, and comprising the ratchet wheel, and a pinion, coaxial with the ratchet wheel, interacting with the first rack in such a way that rotation of the pinion drives the first jaw and/or the second jaw, respectively;

the first jaw and/or the second jaw comprise(s) an elastically deformed pad bearing on the cell phone, the deformability of the pad allowing at least one passage between two consecutive indexed positions defined by the interaction of the ratchet wheel and the first pawl.

According to a third main aspect, particularly advantageous for the use of any cell phone:

the adapter comprises a plate movably mounted on the base and to which the spacer is rigidly attached, removably, for example by clamping, or non-removably, for example forming a one-piece assembly;

the spacer is preferably mounted on the base by clipping;

the plate is mounted slidably on the base in at least one direction, preferably exclusively in a single sliding direction;

preferably, the cell phone is clamped on the base in a clamping direction;

the sliding direction is parallel to the clamping direction;

the adapter includes a deactivatable lock for selectively locking the plate in position relative to the base;

the plate is movable on the base incrementally;

the adapter includes a second deactivatable non-return system preventing a return movement of the plate relative to the base;

the second non-return system comprises:

a second rack, a second deactivatable pawl, engaged in the second rack, and a second elastic member, for example a spring, elastically pushing the second pawl against the second rack;

the acquisition opening is laterally offset with respect to the clamping zone in which the cell phone is clamped to the adapter, a lateral offset being a non-zero distance, in an offset direction perpendicular to the clamping direction and in a plane parallel to the plane of the front face of the cell phone, between the position of the center of the acquisition opening and the position of the center of the clamping zone;

the lateral offset is greater than 1 cm, preferably greater than 2 cm, preferably greater than 3 cm, preferably greater than 4 cm, and/or less than 10 cm.

According to a fourth main aspect, particularly advantageous for improving hygiene:

the spacer may be made in one piece with the base, or the adapter may be removably attached to the spacer;

if the adapter is removably attached to the spacer, preferably the adapter comprises an adapter attachment portion and the spacer comprises a spacer attachment portion interacting, in said acquisition position, with the adapter attachment portion to attach the adapter to the spacer, the spacer attachment portion being configured to retain its shape when it is coupled to and/or uncoupled from the adapter attachment portion;

preferably, no point on the surface of the spacer attachment portion moves, during said coupling and/or said uncoupling, by more than 1 mm, preferably by more than 0.5 mm, preferably by more than 0.2 mm;

the spacer attachment portion is formed by a recess and/or a bead of spacer material;

the distance between the spacer attachment portion and the acquisition opening is less than 3 cm, preferably less than 2 cm, preferably less than 1 cm, preferably less than 0.5 cm.

According to a fifth main aspect, particularly advantageous in terms of saving the environment:

the spacer is made of a biodegradable material, preferably a fibrous material, preferably cellulose-based, preferably cardboard.

According to a sixth main aspect, particularly advantageous for improving hygiene and compliance:

the spacer and/or the adapter, preferably the spacer, bears a personalization mark, preferably relating to the user and/or to a pathology of the user and/or to a dental care professional and/or to a group of dental care professionals;

the personalization mark includes an identifier identifying the user and/or the pathology of the user and/or the dental care professional and/or the group of dental care professionals;

the personalization mark is attached by means of one or more clip(s), screw(s), hook-and-loop tape(s) of Velcro® type, elastic band(s), magnet(s), hook(s), bolt(s), strap(s), suction cup(s), or an adhesive material, or is inscribed or engraved;

the personalization mark is removable or erasable;

the personalization mark is borne by a sticker or a magnet or a clipped-on token;

the personalization mark depicts a design or a trademark or a three-dimensional shape;

the personalization mark is in a color and/or a material different to the color and/or material, respectively, of the spacer and/or the adapter bearing it;

the personalization mark is borne by the spacer, the spacer preferably being a fibrous material, preferably cardboard.

According to a seventh main aspect, particularly advantageous for improving hygiene and saving the environment:

the adapter is removably attached to the spacer;

the acquisition kit comprises, in addition to the spacer attached to the adapter, at least one other spacer that may be assembled to the adapter and is different to the spacer attached to the adapter;

said other spacer differs from the spacer attached to the adapter in that it bears a different personalization mark and/or has a different oral opening and/or has a different length;

preferably, said other spacer differs from the spacer attached to the adapter in that it bears a different personalization mark and/or has a different oral opening, but has an identical length, which, advantageously, allows an identical acquisition configuration of the cell phone regardless of the spacer used.

According to an eighth main aspect, particularly advantageous for improving acquisition:

in said acquisition position, the lens and the flash of the cell phone are opposite the adapter opening and/or opposite the acquisition opening;

the oral opening and the adapter opening are in fluid communication, and said chamber is preferably empty;

said chamber does not contain any artificial light source;

- the acquisition kit only includes the flash to illuminate the oral opening, in other words the flash is the only artificial light source for illuminating the oral opening;
- the smallest dimension of the adapter opening and/or of the acquisition opening, for example the width for a rectangular-shaped opening, is greater than 1 cm, preferably greater than 2 cm, preferably greater than 3 cm, and/or less than 5 cm, preferably less than 4 cm;
- the largest dimension of the adapter opening and/or of the acquisition opening, for example the diagonal for a rectangular-shaped opening, is greater than 2 cm, preferably greater than 3 cm, preferably greater than 4 cm, preferably greater than 5 cm, and/or less than 10 cm, preferably less than 9 cm, preferably less than 8 cm, preferably less than 7 cm, preferably less than 6 cm;
- the adapter opening and/or the acquisition opening has/have a generally rectangular shape, the corners of which are preferably rounded, which facilitates cleaning;
- the adapter opening and the acquisition opening have areas that differ by less than 20%, preferably less than 10%, preferably less than 5%, preferably less than 1% from one another, based on the area of the adapter opening;
- preferably, the areas of the adapter opening and of the acquisition opening are identical, said openings preferably being coincident;
- the area of the adapter opening is less than or greater than the area of the oral opening;
- the adapter opening and the oral opening have areas that differ by less than 30%, less than 20%, and/or more than 5%, preferably more than 10% from one another, based on the area of the adapter opening;
- the kit comprises a first spacer comprising a first oral opening having an area greater, preferably by more than 10% and/or less than 30%, than the area of the adapter opening, and a second spacer comprising a second oral opening having an area less, preferably by more than 10% and/or less than 30%, than the area of the adapter opening, and each of the first and second spacers may be removably mounted on the adapter;
- the first and second spacers comprise first and second feet for nesting in the adapter, respectively, the first and second nesting feet having the same shape;
- the kit comprises, in addition to the first and second spacers, a third spacer comprising a third oral opening having an area substantially equal to the area of the adapter opening, the third spacer preferably comprising a third nesting foot having the same shape as the first and second nesting feet.

According to a ninth main aspect, particularly advantageous for improving the accuracy of the data acquired:

- the representation of the spacer in the view seen by the lens in an acquisition configuration of the cell phone accounts for less than 50%, preferably less than 40%, preferably less than 30%, preferably less than 20%, preferably less than 10%, preferably less than 5%, of the surface area of said view;
- the acquisition configuration is the default configuration of the cell phone or a predetermined configuration that the user selects, or a configuration determined by the cell phone specifically for the use of the acquisition kit;
- the configuration determined by the cell phone for the use of the acquisition kit is determined on the basis of the spacer;
- the chamber is generally tubular and rectilinear in shape; such a shape advantageously allows
  - a large oral opening, allowing several teeth to be seen simultaneously,
  - a small adapter opening, allowing the use of a cell phone in which the camera is on the periphery of the cell phone, and
  - a representation of the spacer in the view seen by the lens which accounts for a small fraction of the surface area of said view;
- the chamber comprises a segment which diverges toward the oral opening, said divergent segment starting at less than 5 cm, preferably at less than 3 cm, preferably at less than 1 cm from the adapter opening, preferably starting at the adapter opening or at the acquisition opening;
- said divergent segment extends over more than 3 cm, preferably more 4 cm, preferably more 4 cm and/or less than 10 cm along the chamber;
- the chamber comprises a segment which converges toward the oral opening, said converging segment ending less than 5 cm, preferably less than 3 cm, preferably less than 2 cm, preferably less than 1 cm from the oral opening, said converging segment preferably extending as far as the oral opening;
- the length of the chamber, measured along the axis of the adapter opening, is greater than 3 cm, preferably greater than 5 cm, and/or less than 25 cm, preferably less than 15 cm.

In one embodiment of the invention, the cell phone holder is shaped so that the representation of the spacer in the view seen by the lens of this cell phone in the default configuration of this cell phone accounts for less than 50%, preferably less than 40%, preferably less than 30%, preferably less than 20%, preferably less than 10%, preferably less than 5%, of the surface area of said view.

In one embodiment, an acquisition configuration is predetermined so that the representation of the spacer in the view seen by the lens of the cell phone in said acquisition configuration accounts for less than 50%, preferably less than 40%, preferably less than 30%, preferably less than 20%, preferably less than 10%, preferably less than 5%, of the surface area of said view. This predetermined acquisition configuration is programmed into the cell phone. The user or the cell phone may select it, for example according to the spacer used.

According to a tenth main aspect, particularly advantageous for improving hygiene:

- the adapter is removably attached to the spacer and the distance between the acquisition opening and the lens is less than 3 cm, preferably less than 2 cm, preferably less than 1 cm, preferably less than 0.5 cm;
- the spacer has one end housed, preferably nested, in a housing of complementary shape defined by the adapter, said end defining a protective lining for said housing;
- the wall of the lining is continuous, in other words it does not have any through holes.

According to an eleventh main aspect, particularly advantageous for improving acquisition:

- the oral opening extends partially outside the plane passing through its center and perpendicular to the axis connecting the center of the oral opening and the center of the acquisition opening;
- the spacer has
  - a body, preferably of generally tubular shape, defining the oral opening and a distal flange extending outward from the body and shaped so as to be inserted between the user's lips and teeth;

the distal flange has a lateral end separated from said plane by a distance of greater than 5 mm and less than 12 mm;

the two lateral ends of the distal flange are separated from said plane by the same distance;

the oral opening has a curvature about a vertical axis in the service position, the radius of said curvature being greater than 20 mm, preferably greater than 30 mm, preferably greater than 40 mm, preferably greater than 45 mm, preferably greater than 47 mm, and/or less than 80 mm, preferably less than 70 mm, preferably less than 60 mm, preferably less than 58 mm, preferably less than 55 mm;

the oral opening has a curvature exclusively about said vertical axis;

the ratio between the distance between the lateral ends of the distal flange and said distance between said lateral ends and said plane is between 5 and 8;

the distal flange lies in the extension of the oral opening;

in a segment of the spacer extending over more than 70%, more than 80%, more than 90%, more than 95%, more than 99%, preferably 100% of the length of the spacer, the spacer has an outer surface without any protruding corner edge and/or without any re-entrant corner edge, the length of the spacer being measured along an axis connecting the centers of the acquisition opening and of the oral opening, a segment of the spacer being a fraction of the spacer delimited by two planes perpendicular to said axis;

in said segment, the spacer has an outer surface without any protruding corner edge marking a break in slope of greater than 90° and/or without any re-entrant corner edge marking a break in slope of greater than 90°;

the outer surface of the spacer has, at any point in the transition zone between the distal flange and the body 40, a radius of curvature of greater than 1 mm, preferably greater than 1.5 mm, preferably greater than 2 mm, preferably greater than 3 mm and/or less than 4 cm;

the distal flange is interrupted, or has a height of less than 5 mm, preferably less than 4 mm, preferably less than 3 mm, preferably less than 2 mm, preferably less than 1 mm, continuously, over a length of greater than 3 mm, greater than 5 mm, even greater than 10 mm, or even greater than 15 mm, and/or less than 50 mm, preferably less than 30 mm, preferably less than 20 mm;

said interruption or said reduction in height is centered on a labial frenulum in the service position, when the user is holding the acquisition kit in front of them, for example to acquire images of their incisors;

the distal flange borders the oral opening, in other words extends at the periphery of the oral opening;

the distal flange is flat;

the distal flange extends radially with respect to the axis of the chamber connecting the centers of the adapter opening and of the oral opening;

the distal flange lies in the extension of the oral opening;

the distal flange has a maximum height of greater than 1 mm, greater than 2 mm, greater than 3 mm, and/or less than 10 mm, 8 mm, or 6 mm;

the distal flange has a thickness of greater than 0.5 mm, preferably greater than 1 mm, and/or less than 6 mm, preferably less than 4 mm, preferably less than 3 mm, preferably less than 2 mm;

the distal flange is rigidly attached to the body, in such a way as not to move or deform under the pressure of the user's lips, in the service position; in other words, the distal flange is not elastically attached to the body;

the body is non-deformable, and in particular does not deform under the pressure of the user's lips, in the service position;

the body and the distal flange form a non-deformable one-piece assembly;

the chamber comprises a segment which diverges toward the oral opening, said divergent segment preferably starting at less than 5 cm from the adapter opening and preferably ending at the oral opening;

said divergent segment is defined by a wall having a constant thickness.

Naturally, the features, whether optional or not, which define the above main aspects are preferably combined with one another.

The following documents have been cited by the INPI in relation to one or more of the above main aspects:

US2020060623A1, or SAYANI;
KR101584737B1, or YOO;
US 2018/303580, or SALAH;
US20190167115A1, or DORODVAND;
WO2017105392A1, or CHEN;
WO2016185463A1, or HEFEZ;
EP 3 714 764, or OKIYAMA;
CN 212 086 241U, or FOSHAN;
US 2014/339278, or DITORE;
US 2013/148273, or TSAI;
GB 2 438 662, or LELAND;
WO2021173867, or OREN;
WO2021058930, or CHAMBERS; and
US 2020/315434, or KOPELMAN.

The invention also relates to a method for acquiring 2D or 3D data by means of an acquisition kit according to the invention, said method comprising the following steps:

a) optionally, the selection, by the user, of a spacer from a set of available spacers, preferably on the basis of personalization marks borne by said available spacers and/or the morphology of the user;

b) assembly, preferably by the user, of the acquisition kit, in particular by attaching the cell phone to the adapter, and optionally the spacer to the adapter;

c) insertion, by the user, of the end of the spacer defining the oral opening into the mouth of the user, preferably by inserting the flange of the spacer between their lips and their teeth;

d) positioning, by the user, of the oral opening opposite teeth for which said data are to be acquired;

e) activation, preferably by the user, of the cell phone in such a way as to acquire said 2D or 3D data;

f) optionally, modification of the position of the oral opening, for example by rotation about the user and/or by rotation from bottom to top, then return to step e);

g) optionally, disassembly of the acquisition kit, preferably by the user;

h) optionally, washing and/or disinfection of the spacer, or even only of the spacer.

Preferably, in step d), the spacer is positioned in such a way as not to rest on the gums, or on the teeth, or on any orthodontic appliance worn on the teeth. Preferably, it is in contact only with the lips and the inner surface of the cheeks.

The distal flange may in particular be more than 1 mm, more than 2 mm, more than 3 mm, and/or less than 10 mm, preferably less than 8 mm from the teeth.

In step f), the rotation may be from right to left or from left to right, about a vertical axis in the service position. The degree of rotation is preferably greater than 10°, greater than 20°, greater than 30°, greater than 40°, greater than 50°, and/or less than 90°, in particular when step e) has been performed facing the user.

In step f), the rotation may be from top to bottom or from bottom to top, about a horizontal axis in the service position. The degree of rotation is preferably greater than 10°, greater than 20°, and/or less than 60°, in particular when step e) has been performed facing the user, the optical axis being horizontal.

By repeating steps e) and f), the user thus acquires 2D or 3D data on different teeth with different orientations.

Definitions

"User" means any person for whom a kit according to the invention may be used, whether or not this person is ill, or whether or not this person is undergoing treatment. A kit according to the invention may be used for an animal other than a human being.

"Dental care professional" means a dentist, an orthodontist or an orthodontic laboratory.

A "cell phone" or "mobile phone" is a device such as an iPhone®. Such a device typically weighs less than 500 g, has a camera with a lens allowing it to take videos or photos, or even a scanner allowing it to acquire three-dimensional digital models. A cell phone is also capable of exchanging data with another device located more than 500 km away from the cell phone, and is capable of displaying said data.

The "default configuration" of a cell phone consists of all the settings of this cell phone as defined before it is first used.

"Image" means a two-dimensional image, such as a photograph. An image is made up of pixels.

A "video" is considered to be a set of photos.

"Model" means a three-dimensional digital model. A model is made up of a set of voxels.

The cell phone makes it possible to acquire "extraoral" data, that is to say without inserting the lens of the cell phone into the mouth of the user. The "2D data" acquired by a cell phone are images, and in particular, conventionally, photos and video. The "3D data" acquired by a cell phone are data providing coordinates in all three dimensions of space. The "3D data" are preferably three-dimensional digital models.

A "retractor", or "dental retractor", is a device for rolling back the lips.

It comprises an upper flange and a lower flange, and/or a right flange and a left flange, extending around a retractor opening and intended to be inserted between the teeth and the lips. In the service position, the lips of the user rest on these flanges, such that the teeth are visible through the retractor opening. A retractor thus makes it possible to see the teeth without the lips getting in the way.

However, the teeth do not rest on the retractor, such that the user can, by turning the head relative to the retractor, change which teeth are visible through the retractor opening. They may also modify the distance between their dental arches. In particular, a retractor does not press on the teeth in such a way as to move the two jaws apart.

In one embodiment, a retractor is configured to elastically move the upper and lower lips apart in such a way as to expose the teeth visible through the retractor opening.

In one embodiment, a retractor is configured such that the distance between the upper flange and the lower flange, and/or between the right flange and the left flange is constant.

Retractors are described for example in PCT/EP2015/074896, U.S. Pat. No. 6,923,761, or US 2004/0209225.

"Attaching" one part to another means establishing a physical connection between these two parts, such that any movement of one of these parts eventually causes movement of the other part. A part mounted in translation, rotatably or via a ball joint on another part is "attached" to this other part. Attachment may be "permanent" or performed "removably", depending on whether or not the two parts are designed to be dismantled, preferably by hand, by a user. An attachment may be rigid or otherwise, depending on whether or not it allows relative movement between the two parts attached to one another. An element made in one piece with another element is considered to be "attached" to this other element.

Two parts are "elastically movable" relative to one another if their relative position may be modified under the action of a force and if, when this force ceases, they return to their initial relative positions.

A "corner edge" of a surface is a line on this surface which has a length greater than 1 cm, and which is made up of points at which a line of greatest slope has a change in slope, also referred to as a "break in slope", of greater than 45°. By extension, it is also said that the angle of the corner edge is greater than 45° or that the surface has a break in slope of greater than 45°. A corner edge is re-entrant when it defines a recess. For example, FIG. 15 depicts a surface $S_1$ on which the line of greatest slope G has a break in slope of θ at any point M A on the line A. If the angle θ is greater than 45° for all the points on the line A, the line A is a corner edge. In practice, it is possible to measure the change in slope between two points $M_1$ and $M_2$ separated by a distance of 3 mm on the line of greatest slope, the distance of 3 mm being measured along said line.

An "assembled position" is a position in which the cell phone is rigidly attached to the adapter of the kit, and the spacer is rigidly attached to the adapter.

An "acquisition position" is an assembled position in which the lens of the cell phone has an at least partial, preferably a full, view of the oral opening, through the adapter opening and the acquisition opening.

The "service position" is the position in which the spacer of the kit, in the acquisition position, is partially inserted in the user's mouth, as shown in FIG. 12.

The "mouth closed" position is the occlusion position in which the upper and lower teeth of the user are in contact.

The "mouth open" position is the position in which the mouth is fully open.

Unless stated otherwise, the qualifying terms used to define positions or orientations in space, such as "horizontal", "vertical", "bottom", "top", "upper", "lower", "right" or "left", are defined, for the sake of clarity, with reference to a service position seen by a user, with their head straight and having placed their lips around the oral opening of the spacer.

For example, a vertical axis is an axis which, in the service position, is vertical.

The lateral ends (right and left) of the distal flange are the points on the distal flange that are furthest to the right and to the left of the user in the service position.

Unless stated otherwise, the qualifying terms "outer" and "inner" refer to volumes or closed contours, to designate an element outside the volume, for example outside a chamber, or outside the closed contour. For example, the outer surface of a tubular body is the surface that is exposed to the outside of the tubular body.

The adjectives "first" and "second" are used purely for the sake of clarity.

For clarity, an axis or a direction which, in the service position, extends horizontally and perpendicular to the general plane of the oral opening, is referenced $X_i$, "i" being an index referring to a part concerned by this axis or this direction. An axis or a direction which, in the service position, extends vertically is referenced $Z_i$, "i" being an index referring to a part concerned by this axis or this direction. An axis or a direction which, in the service position, extends perpendicular to the axes $X_i$ and $Z_i$ is referenced $Y_i$, "i" being an index referring to a part concerned by this axis or this direction. For the user, the axes $X_i$, $Y_i$, and $Z_i$ are therefore front-rear, right-left, and vertical axes, respectively.

The axis of an opening is the axis that passes through its center, perpendicular to the general plane of the opening.

First and second straight lines are said to be perpendicular to one another when first and second planes perpendicular to said first and second straight lines, respectively, are perpendicular to one another.

"Include", "comprise" and "have" shall be construed broadly and as not implying any limitation, unless stated otherwise.

BRIEF DESCRIPTION OF THE DRAWINGS

Further features and advantages of the invention will become apparent on reading the detailed description which follows and on studying the appended drawing, in which:

FIG. 1 shows a kit according to the invention, in perspective, in the assembled position;

FIG. 2 shows the spacer of the kit of FIG. 1, in perspective;

FIG. 3 depicts, for the kit of FIG. 1, the separation movement of the first jaw, from the moved-together position (FIG. 3A) to the spaced-apart position (FIG. 3B), passing through an intermediate position (FIG. 3C);

FIG. 4 depicts the adapter of the kit of FIG. 1 partially disassembled, so as to show the movement of the first jaw, in an intermediate position of the first jaw, seen from the front (FIG. 4A), from the side (FIG. 4B) and in section along BB shown in FIG. 4B (FIG. 4C);

FIG. 5 shows the partially disassembled adapter of FIG. 4, in the moved-together position, seen from the front (FIG. 5A), from the side (FIG. 5B) and in section along BB shown in FIG. 5B (FIG. 5C);

FIG. 6 depicts the adapter of the kit of FIG. 1 partially disassembled, so as to show the movement of the plate on the base, seen from the front, without a cell phone (FIG. 6A), and with the cell phone (FIG. 6B), the adapter opening being in the bottom position;

FIG. 7 shows the partially disassembled adapter of FIG. 6 seen from the front, without a cell phone (FIG. 7A), and with the cell phone (FIG. 7B), the adapter opening being in the top position, opposite the lens of the cell phone in FIG. 7B (acquisition position);

FIG. 8 shows an exploded view of the holder of the kit of FIG. 1;

FIG. 9 schematically shows a kit according to the invention, seen from the side;

FIG. 10 schematically shows a kit according to the invention, seen from the side;

FIG. 11 schematically shows a detail of a spacer of a kit according to the invention, seen from the side;

FIG. 12 schematically depicts the service position, the user being seen from the front (FIG. 12A) and from the side (FIG. 12B);

FIG. 13 shows a view seen through the lens of the cell phone;

FIG. 14 shows in perspective the adapter of the kit of FIG. 1;

FIG. 15 shows the definition of a corner edge;

FIG. 16 shows a first spacer seen from above (FIG. 16A) and from the front (FIG. 16B), and a second spacer, from the same acquisition kit, seen from above (FIG. 16C) and from the front (FIG. 16D).

In the various figures, identical or similar members have been designated using identical references.

The figures are provided for illustrative purposes. They are not limiting.

DETAILED DESCRIPTION

The kit 10 shown in FIG. 1 includes a cell phone 12 and a holder 14.

The Cell Phone

Any conventional cell phone may be used.

A cell phone 12 is a personal device, conventionally of substantially parallelepiped shape, conventionally comprising a camera.

A cell phone typically has:

- a front face $12_1$ equipped with a lens 16 and, preferably, a flash 18, as shown in FIG. 6,
- a rear face $12_2$ having a screen 20, and
- a side edge 22, defining the thickness of the phone and connecting the front and rear faces.

The front and rear faces are conventionally generally rectangular in shape, parallel and have the same dimensions. Their length $L_{12}$ is typically between 8 and 20 cm. Their width $l_{12}$ is typically between 4 and 10 cm, as shown in FIG. 1.

The thickness of the cell phone is typically between 4 mm and 15 mm.

The screen 20 covers substantially the entire rear face. It serves as the interface for the user. In particular, it allows the user to visualize what the lens 16 "sees", that is to say the "view" seen by the lens. Preferably, the screen 20 is touch-sensitive and makes it possible to control functions of the cell phone.

The lens 16 conventionally has an optical axis $X_{16}$ perpendicular to the front face, and allows the acquisition of 2D or even 3D data. In particular, it allows the acquisition of color photos, and/or infrared photos. Infrared photos advantageously make it possible to show the teeth with excellent contrast.

The lens 16 typically has a diameter greater than 1 mm and less than 15 mm.

It is sometimes at the center of the cell phone. It is generally positioned close to one side of the front face, for example less than 3 cm from a short side of the front face, conventionally halfway along this side, or in a corner of the front face, for example less than 1 cm from a corner of the front face.

The cell phone 12 may comprise, on the front face, several lenses, for example two, more than two, more than three or more than four lenses 16 and/or less than eight, or less than six lenses.

The flash 18 may be close to the lens 16, preferably less than 4 cm, less than 3 cm, less than 2 cm, or less than 1 cm and/or more than 1 mm from the lens 16. The cell phone 12 may comprise, on the front face, several flashes, for example more than two, more than three or more than four flashes and/or less than eight, or less than six flashes.

In a preferred embodiment, the cell phone comprises computer software for guiding the user during the operations, for example to instruct the user how to assemble or use the kit, for example to tell the user the position and/or the orientation to be given to the holder to take particular photos.

The cell phone 12 is attached, preferably removably, to the holder 14.

The Holder

The holder 14 has a dual purpose. It makes it possible, simultaneously, to

- push back the lips of the user to move them away from the teeth, and
- facilitate positioning and orientation of the cell phone in relation to the teeth.

It comprises a spacer 24 and an adapter 26.

In the assembled position, the spacer 24 and the adapter 26 together define a chamber 28 (see FIG. 3) opening out, preferably exclusively, through an oral opening Oo and through an adapter opening Oa, opposite the lens 16 of the cell phone 12.

The chamber 28 is preferably substantially tubular, preferably rectilinear with an axis $X_{28}$.

The length of the chamber 28, measured along the axis Xa of the adapter opening, is preferably greater than 3 cm, preferably greater than 5 cm, and/or less than 25 cm, preferably less than 20 cm, preferably less than 15 cm, preferably less than 10 cm, preferably less than 8 cm, preferably less than 7 cm.

The length of the chamber 28 is preferably constant in the assembled position.

Preferably, the chamber 28 opens to the outside only through the oral opening Oo and the adapter opening Oa and, more preferably, the cell phone 12 closes off the adapter opening Oa. Advantageously, light levels in the external environment do not affect the acquisition of data (images or 3D models) by the cell phone.

Preferably, the holder does not include any artificial illumination means, illumination of the oral opening preferably being ensured exclusively by the flash of the cell phone 12.

The oral opening defined by the spacer 24 may extend in a vertical plane Po, passing through its center Co, preferably perpendicular to the axis $X_{24}$ connecting the centers of the oral opening Oo and of the acquisition opening Oa'.

Preferably, however, as shown in FIG. 16, the oral opening extends partially outside the plane Po, on the side opposite the body 40 of the spacer, that is to say on the side of the user in the service position.

Preferably, the oral opening Oa is curved about a vertical axis Zo in the service position, preferably exclusively about a vertical axis Zo, in such a way as to get close to the teeth in the service position.

The distal flange 46, preferably the spacer 24, is/are preferably symmetrical with respect to a vertical plane which, in the service position, is coincident with the sagittal plane. The axis Zo is preferably included in this vertical plane and perpendicular to the axis $X_{24}$.

Preferably, the radius of curvature about the vertical axis Zo, in particular in the region of said vertical plane, is greater than 20 mm, preferably greater than 30 mm, preferably greater than 40 mm, preferably greater than 45 mm, and/or less than 80 mm, preferably less than 70 mm, preferably less than 60 mm, preferably less than 55 mm, preferably approximately 50 mm.

Preferably, the radius of curvature varies by less than 30%, preferably by less than 20%, preferably by less than 10%, or is even substantially constant along the distal flange, that is to say across the distal flange in a top view as shown in FIGS. 16A and 16C.

A radius of curvature of between 47 mm and 58 mm is particularly suitable.

Seen from above, the teeth of a dental arch have a curvature of which the radius increases considerably in the direction toward the back of the mouth, like a C that widens. If the curvature of the oral opening follows the curvature of the teeth, the holder is particularly stable in the service position, but this stability impairs rotation about the user. Furthermore, it results in the oral opening moving away from the teeth when the user performs such a rotation.

In a particularly advantageous embodiment of the invention, the curvature of the oral opening does not allow the distal flange 46 to follow the teeth.

Such a curvature of the oral opening offers several additional advantages as regards the extraoral acquisition of 2D or 3D data.

Tests have shown in particular that such a curvature limits the risk of the lips coming over the distal flange and blocking the oral opening when the kit is oriented, to the right or left of the user, for the acquisition of 2D or 3D data, and in particular photographs, facing the molars or premolars (lateral viewing positions). In these positions to the right or left of the user, this curvature also prevents the spacer from coming into abutment, for example, with an attachment of an orthodontal appliance. This curvature also prevents the spacer from pinching the cheeks when the oral opening is brought back to face the incisors.

Tests have also shown that this curvature limits pulling on the lips in lateral viewing positions, which improves comfort, and therefore compliance with any orthodontal treatment.

"Curved" means a general shape making it possible to follow an arc, that is to say to follow the shape of at least part of a "C". Preferably, the curvature is continuous, with no break in slope, so as not to create re-entrant corner edges.

The adapter opening Oa may be defined by the adapter 26 and/or by the spacer 24.

Preferably, the adapter opening Oa is defined by the adapter 26 and the spacer 24 defines an acquisition opening Oa' (see FIG. 2).

The area of the oral opening is preferably greater than 500 $mm^2$, preferably greater than 800 $mm^2$, preferably greater than 1000 $mm^2$, preferably greater than 1100 $mm^2$, preferably greater than 1200 $mm^2$, preferably greater than 1300 $mm^2$, and/or less than 2000 $mm^2$, preferably less than 1800 $mm^2$, preferably less than 1600 $mm^2$, preferably less than 1500 $mm^2$, preferably less than 1400 $mm^2$.

Preferably, the oral opening is shaped in such a way that the lens of the cell phone can see several teeth, preferably more than two, more than three, more than four, more than five and/or less than 32 teeth, through the acquisition opening.

The oral opening is preferably oval, and has a length, in the horizontal direction, which is greater than its height, in the vertical direction.

The length of the oral opening is preferably greater than 50 mm, preferably greater than 60 mm, preferably greater than 70 mm, and/or less than 100 mm, preferably less than 90 mm.

The height of the oral opening is preferably adapted to allow the mouth of the user to close in the service position. It is preferably greater than 20 mm, preferably greater than 25 mm, preferably greater than 30 mm, and/or less than 50 mm, preferably less than 40 mm.

The area of the acquisition opening is preferably greater than 500 $mm^2$, preferably greater than 800 $mm^2$, preferably greater than 1000 $mm^2$, preferably greater than 1100 $mm^2$, preferably greater than 1200 $mm^2$, preferably greater than 1300 $mm^2$, preferably greater than 1400 $mm^2$, preferably greater than 1500 $mm^2$, preferably greater than 1600 $mm^2$, and/or less than 2000 $mm^2$, preferably less than 1900 $mm^2$, preferably less than 1800 $mm^2$, preferably less than 1700 $mm^2$.

In a preferred embodiment, the spacer 24 has the shape of a tubular body opening out exclusively through the oral opening Oo and acquisition opening Oa'.

The oral opening Oo and the acquisition opening Oa' are preferably coaxial.

Preferably, as shown schematically in FIG. 9, in the assembled position, the distance d between the acquisition opening Oa' of the spacer 24 and the adapter opening Oa is less than 3 cm, preferably less than 2 cm, preferably less than 1 cm, preferably less than 0.5 cm, preferably less than 0.2 cm, preferably substantially zero. The distance d is also shown in FIG. 14. Preferably, the acquisition opening Oa' of the spacer and the adapter opening Oa are coplanar. Advantageously, the spacer 24 forms a lining which protects the adapter from the air expelled by the user, and in particular from spittle. This improves hygiene.

Preferably, the acquisition opening Oa' of the spacer and the adapter opening Oa have substantially the same dimensions. They are preferably coaxial.

Preferably, as shown in FIG. 10, one end 23 of the spacer 24 is housed, preferably nested, in a housing 25, preferably of complementary shape. The housing 25 defines the adapter opening Oa. Preferably, the spacer 24 passes through this housing over its entire length.

At least said end of the spacer 24, preferably the entire spacer 24, is defined by a solid wall, that is to say that the spacer only opens to the outside through the oral opening and the acquisition opening.

In one embodiment, the adapter 26 and the spacer 24 form a one-piece assembly, the adapter 26 being rigidly attached to the spacer 24 permanently, or even being made in one piece with the spacer.

The adapter 26 is preferably rigidly attached to the spacer 24 removably.

Advantageously, the adapter 26 may be used for several spacers.

Also advantageously, the spacer 24 may be cleaned or sterilized independently of the adapter.

In particular in this embodiment, the spacer 24 is preferably made of a material that can withstand autoclaving, preferably in an autoclavable or a dishwasher. Preferably, the spacer may be sterilized more than 50 times without degrading. Sterility is considered to be achieved when the probability of isolating a germ is less than one in 1 million, according to the sterility assurance level (SAL) regulated by standard EN 556.

Preferably, the adapter 26 is rigidly attached to the spacer 24 by means of a clip that has adapter $\mathbf{27}_{26}$ and spacer $\mathbf{27}_{24}$ attachment portions, as shown in FIG. 8. The adapter and spacer attachment portions interact with one another to provide releasable attachment of the adapter to the spacer. They may therefore be coupled or uncoupled to attach or detach the adapter to/from the spacer, respectively.

Preferably, the spacer attachment portion $\mathbf{27}_{24}$ is stationary on the spacer 24, in other words it is not designed to be moved during assembly and disassembly with the adapter attachment portion. Preferably, the spacer attachment portion $\mathbf{27}_{24}$ is not deformed during assembly and disassembly with the adapter attachment portion. It retains its shape when it is coupled to and/or uncoupled from the adapter attachment portion $\mathbf{27}_{26}$. For example, it may be formed in the wall of the spacer 24 which delimits the chamber 28, by a bead of material or by a blind recess. The spacer attachment portion is considered to retain its shape when no point on its surface moves, during assembly and disassembly, by more than 1 mm Preferably, no point on the surface of the spacer attachment portion moves, during assembly and disassembly, by more than 0.5 mm, preferably by more than 0.2 mm.

The stationary nature of the spacer attachment portion $\mathbf{27}_{24}$, which may be described as "passive", advantageously makes it possible to avoid its deformation during a spacer 24 sterilization operation. This feature is particularly advantageous when the adapter 26 does not need to be sterilized, for example because it is protected by the spacer 24.

Preferably, the adapter attachment portion $\mathbf{27}_{26}$ is movable relative to the rest of the adapter. For example, it may be formed by a claw, adapted to hook onto a bead of spacer material or to fit elastically into a recess in the spacer 24, as shown in FIG. 8.

The adapter attachment portion $\mathbf{27}_{26}$ may also be a part of the elastically deformable adapter, for example a bead of elastically deformable material. In one embodiment, the adapter carries one or more beads, for example four beads, arranged so as to fit elastically into one or more respective recesses made on the outer surface of the body of the spacer during assembly.

Preferably, the spacer attachment portion $\mathbf{27}_{24}$ and the adapter attachment portion $\mathbf{27}_{26}$ are made of a rigid material, that is to say not deformable when pressed by hand, unlike an elastic material such as an elastomer. Preferably, this material has a hardness greater than 70 Shore D and/or less than 100 Shore D.

Preferably, the kit, preferably at least the spacer 24, bears a personalization piece bearing the personalization mark 39 attached, preferably removably, to the adapter 26 and/or to the spacer 24.

The personalization mark 39 preferably comprises an identifier identifying the user and/or a dental care professional's practice and/or a company, for example a group of dental care professionals.

In one embodiment, the user identifier is specific, that is to say it makes it possible to uniquely identify the user. In other words, it is only used for the user.

The personalization mark 39 may also include information relating to a pathology of the user.

The personalization mark 39, in particular the personalization piece, is preferably attached, preferably removably, to the adapter 26 and/or to the spacer 24, by the user or by a dental care professional in charge of the user, for example an orthodontist who has previously fitted an orthodontal appliance, active or passive, in the mouth of the user.

The personalization piece may be attached by any known means, in particular by means of one or more clip(s), screw(s), hook-and-loop tape(s) of Velcro® type, elastic band(s), magnet(s), hook(s), bolt(s), strap(s), suction cup(s), or an adhesive material.

The personalization mark may also be inscribed, or engraved, on the spacer or the adapter, preferably on the spacer.

The inscription may for example be inscribed by means of a pen, for example an indelible marker, in particular on a cardboard spacer, or by pad printing.

The identifier may for example consist of a color, alphanumeric characters, a geometric or non-geometric pattern or a particular microstructure.

The personalization mark 39 may comprise an esthetic depiction, for example a jewel, or a fun depiction, for example depicting a comic strip character.

Preferably, the personalization mark 39 is in a color or a material different to the color or material, respectively, of the spacer 24 and/or the adapter 26 bearing it.

The personalization mark 39 may for example represent more than 0.1%, more than 0.5%, more than 1%, more than 3% and/or less than 90%, less than 50%, less than 20%, less than 10% of the surface area of the spacer 24 and/or of the adapter 26 bearing it.

In one embodiment, the kit comprises several removable spacers, referenced $\mathbf{24}_1$ and $\mathbf{24}_2$ in FIG. 8, which may be assembled to the adapter 26 and have oral openings and/or personalization marks, in particular personalization pieces, that are different.

Advantageously, the adapter 26 may be used for several different people, each person using a spacer 24 which is specific to them.

Advantageously, the user takes to the kit more readily, which encourages them to use it. Compliance with a treatment requiring the use of an acquisition kit according to the invention is thereby improved.

Moreover, the adapter may be used for several spacers, for example each assigned to a child from the same family.

The Spacer

The spacer 24 has the function of defining a spacing between the cell phone attached to the adapter 26 and the oral opening Oo as well as an orientation of the cell phone with respect to the oral opening. Advantageously, in the service position, the data (images or 3D models of the user's teeth) acquired by the cell phone 12 through the lens 16 are thus acquired at a predetermined distance from the user's teeth and with a predefined orientation. Preferably, the spacer 24 is configured such that this spacing and this orientation are constant.

The spacer 24 is preferably symmetrical with respect to a horizontal plane and/or with respect to a vertical plane.

The spacer 24 comprises a body 40, opening out at its ends through the oral opening Oo and acquisition opening Oa'.

The body 40 preferably has the general shape of a tube, of constant or variable cross section, preferably substantially rectilinear with an axis $X_{24}$, opening out at its ends through the centers of the oral opening Oo and of the acquisition opening Oa'. The spacer 24 may in particular have the general shape of a cylindrical tube, for example of circular, oval or polygonal, for example rectangular, cross section or a tapered tube.

The cross section of the spacer 24, that is to say in a sectional plane perpendicular to the axis $X_{24}$, preferably has a substantially identical general shape all the way along the tube, for example rectangular or oval or round.

The spacer 24 is preferably shaped such that in the absence of any use of a zoom of the cell phone 12, the representation of the spacer 24 in the view seen by the lens 16 (shown, in FIGS. 9 and 10, by the two dotted lines diverging from the lens 16), accounts for less than 50%, preferably less than 40%, preferably less than 30%, preferably less than 20%, preferably less than 10%, preferably less than 5% of the surface area of said view. In other words, in an image acquired by the cell phone 12, the representation of the spacer 24 takes up a limited surface area.

FIG. 13 provides an example of such a view. The representation of the spacer is the gray area.

Advantageously, the precision of the usable zone representing the teeth is thereby improved.

Preferably, the representation of the spacer 24 in said view shows a portion 42 of the spacer which extends exclusively to less than 5 cm, 3 cm, 2 cm, 1 cm from the oral opening Oo, as shown in FIG. 9.

Advantageously, the focus on the teeth is thereby improved.

To limit the surface area taken up by the representation of the spacer 24 in the view seen by the lens 16, it is possible to limit the length of the spacer 24. The spacer 24 must however have a minimum size for focusing to be possible.

The "acquisition configuration" consists of all the settings of the cell phone which determine the acquisition of 2D or 3D data by the lens 16 of the cell phone. In one embodiment, the acquisition configuration is the default configuration of the cell phone 12.

To limit the surface area taken up by the representation of the spacer 24 in the view seen by the lens 16, alternatively or in addition to limiting the length of the spacer 24, it is possible to configure the cell phone according to an acquisition configuration specifically adapted to the use of the acquisition kit.

The acquisition configuration is preferably defined by the cell phone itself, in other words automatically.

Preferably, the acquisition configuration is obtained by adjusting the zoom of the cell phone. Preferably, the zoom is adjusted by the cell phone, without user intervention for this purpose. For example, the zoom may be adjusted when a program loaded on the cell phone is launched for the use of the acquisition kit.

Preferably, the acquisition configuration, preferably the zoom, is adjusted automatically according to the spacer, for example according to its shape, or its length, or its width. In one embodiment, the spacer is recognized by the cell phone, for example by reading a mark positioned on the spacer or by analysis of the view seen by the lens showing a portion of the spacer, in the acquisition position.

In one embodiment, the acquisition configuration, preferably the zoom, is defined automatically as a function of a distance measured, in the service position, for example to achieve focusing.

To limit the surface area taken up by the representation of the spacer 24 in the view seen by the lens 16, alternatively or in addition to limiting the length of the spacer 24 and adjusting the acquisition configuration, and in particular the zoom of the cell phone, it is also possible to act on the shape of the chamber 28, and in particular on the shape of the spacer 24.

The chamber 28, and preferably at least the spacer 24, preferably comprise(s) at least one segment 44 which diverges, preferably regularly, toward the oral opening Oa. In one embodiment, the divergent segment 44 starts at less than 5 cm, at less than 3 cm, at less than 1 cm from the acquisition opening Oa', preferably at less than 5 cm, at less than 3 cm, at less than 1 cm from the adapter opening Oa.

Preferably, the divergent segment 44 defines the acquisition opening Oa', preferably the adapter opening Oa.

Preferably, the divergence is sufficient that, in the acquisition configuration, for example in the default configuration of the cell phone 12, the divergent segment is not visible to the lens 16 in the acquisition position.

To limit the space requirement, the chamber 28, preferably the spacer 24, preferably comprises at least one segment 45 which converges, preferably regularly, toward the oral opening Oa. In one embodiment, the converging segment ends less than 5 cm, less than 3 cm, less than 1 cm from the oral opening, and preferably defines the oral opening.

In one embodiment, the spacer 24 comprises a said divergent segment 44 and a said converging segment 45. Advantageously, the representation of the spacer 24 in the view seen by the lens 16 may be reduced, which facilitates focusing by the cell phone 12.

Preferably, at least in the zone of the spacer 24 which is visible in the view seen by the lens 16, the spacer 24 has a gray color.

Preferably, the gray color comprises, in RGB (Red, Green, Blue) code, substantially the same value for red, green and blue, the maximum difference between the values for red, green and blue preferably being less than 10, preferably less than 5, preferably substantially zero. Preferably, these values are between 50 and 210, preferably between 70 and 190, more preferably between 90 and 170, preferably between 140 and 160. For example, the gray color may be close to (120, 120, 120), or (150, 150, 150).

Surprisingly, the inventors have discovered that the analysis of the color of the teeth in realistic color photos is thereby facilitated and improved. The photos acquired are therefore well suited to colorimetric analysis.

Without being bound by this theory, the inventors explain this result by the fact that gray is a neutral color, which does not alter colors during an acquisition. To be specific, the settings conventionally used by cell phones may modify the colors in the photo, in particular by shifting the balance of whites.

As shown in FIG. 2, the length $L_{24}$ of the spacer 24, measured along the axis $X_{24}$, is preferably greater than 3 cm, preferably greater than 4 cm, preferably greater than 5 cm, and/or less than 25 cm, preferably less than 20 cm, preferably less than 15 cm, preferably less than 10 cm, preferably less than 8 cm, preferably less than 7 cm.

The width $l_{24}$ of the body 40 of the spacer 24, that is to say its largest dimension in a transverse plane, considering all of the transverse planes along the axis $X_{24}$, is preferably greater than 2 cm and/or less than 10 cm.

The height $h_{24}$ of the body 40 of the spacer 24, that is to say its smallest dimension in a transverse plane, considering all of the transverse planes along the axis $X_{24}$, is preferably greater than 2 cm, preferably greater than 4 cm, preferably greater than 6 cm, preferably greater than 7 cm and/or less than 10 cm, preferably less than 9 cm.

The spacer 24 preferably comprises a distal flange 46 extending outwards, at the periphery of the oral opening Oa and from the outer surface of the body 40, adapted to be inserted between the lips and the teeth of the user.

Advantageously, the lips may thus be moved away so as not to block the oral opening Oa. Furthermore, the distal flange 46 facilitates retention of the spacer 24 in the user's mouth.

The distal flange 46 is preferably made in one piece with the body 40 of the spacer 24, which limits manufacturing costs and limits the number of corner edges. Hygiene is thereby improved.

The distal flange 46 may be overmolded on the body 40. It may be made of elastomer, for optimal comfort.

Preferably, the distal flange 46 is flat, that is to say has the shape of a blade, preferably of constant thickness.

Preferably, the distal flange 46 extends substantially radially relative to the axis $X_{24}$ of the oral opening Oa, that is to say in a plane perpendicular to the axis $X_{24}$. Advantageously, the acquisition of data using the cell phone 12 is thus possible, ergonomically, when the spacer 24 is held horizontally.

Preferably, as shown in FIG. 16, the distal flange lies in the extension of the oral opening. When the oral opening is curved, it may thus be inclined with respect to a plane perpendicular to the axis $X_{24}$.

The distal flange 46 may surround the body 40 partially or completely.

Preferably, it comprises a right portion and a left portion, intended to rest on the right and left commissures of the user's lips, and defining right **46*d* and left 46*g*** lateral ends, respectively.

These right and left portions effectively limit the risk of the lips escaping when the holder is rotated about the user, to the user's right or left, to acquire photos of the teeth at the back of the mouth, particularly the molars.

The distance 146 between the right **46*d* and left 46*g*** lateral ends is preferably greater than 40 mm, preferably greater than 50 mm, and/or preferably less than 80 mm, preferably less than 70 mm Advantageously, these dimensions allow, in the service position, the spacer to be moved laterally to the right and left of the user, but also allow the user to bring their jaws together into the occlusion position in which the user's upper and lower teeth are in contact.

Preferably, the oral opening is curved in such a way that the right **46*d* and left 46*g* lateral ends are separated from the plane Po by a distance $d_{46}$, preferably by the same distance $d_{46}$, as shown in FIG. 16**. The distance $d_{46}$ is preferably greater than 5 mm and less than 12 mm.

The chord which connects the right **46*d* and left 46*g*** lateral ends is preferably parallel to the plane Po.

Preferably, the ratio $l_{46}/d_{46}$ between the distance between the lateral ends of the distal flange and the distance between said lateral ends and the plane Po is between 5 and 8. When the acquisition kit comprises several different spacers, said spacers preferably have different ratios.

The distal flange 46 may be interrupted, as in the embodiment shown, or include a notch, in such a way as to leave free the labial frenulum on the upper and lower arches of the user. The interruption or the notch also allows the spacer 24 to be moved in the mouth of the user, in particular rotations about the dental arches for the acquisition of photos or 3D models in lateral views.

The notch may for example have a triangular, rounded or rectangular shape.

The length $d_{46}$ of the interruption or of the notch is preferably greater than 3 mm, greater than 5 mm, even greater than 10 mm, or even greater than 15 mm, and/or less than 50 mm, preferably less than 30 mm, preferably less than 20 mm (FIG. 2).

The maximum height $h_{46}$ of the distal flange 46 is preferably greater than 1 mm, greater than 2 mm, greater than 3 mm, and/or less than 10 mm, 8 mm, or 6 mm.

As shown in FIG. 11, in the transition zone 47 between the distal flange 46 and the body 40, the outer surface 49 of the spacer 24 preferably has, at any point, a radius of curvature R greater than 1 mm, greater than 1.5 mm, greater than 2 mm, preferably greater than 3 mm, preferably greater than 5 mm, preferably greater than 7 mm, preferably greater than 9 mm, preferably greater than 10 mm, preferably greater than 20 mm, preferably greater than 30 mm, and/or less than 4 cm (FIG. 11). Advantageously, the transition zone therefore does not define any re-entrant corner edge, which facilitates cleaning and further improves hygiene.

Preferably, as shown in FIG. 11, the thickness of the spacer wall is constant at least in the part that bears the distal flange 46, preferably over the entire length of the spacer. In particular, the chamber 28 comprises a segment 44 which diverges toward the oral opening Oo, said divergent segment starting at less than 5 cm from the adapter opening Oa and ending at the adapter opening Oa.

The divergent segment is preferably defined by a part of the wall of the spacer which has a constant thickness.

In one embodiment, the distal flange 46 is removable. In particular, it may be produced in the form of a dental retractor.

Preferably, the body 40, preferably the entire spacer 24, is made of an opaque material. Advantageously, the external environment does not interfere with the lighting of the teeth by the cell phone 12. The body 40 also protects the user's privacy.

The body 40 and/or the distal flange may be made of a rigid material, for example polyethylene PE, polyethylene terephthalate PET, polystyrene PS or polypropylene PP, or a flexible material, for example cardboard.

In one embodiment, the body 40, preferably the entire spacer 24, is made of a recyclable, preferably biodegradable, material preferably according to European standard EN13432, with a residue after 6 months of less than 10%, preferably less than 5%, preferably less than 1%. Preferably, more than 50%, 70%, 80%, or 90% of the spacer 24, as a percentage by weight, is biodegradable.

The material may in particular be a fibrous material, preferably cellulose-based, preferably cardboard.

The spacer may be single-use or disposable.

Also preferably, the spacer 24 is in one piece. Advantageously, its manufacturing cost is thereby limited.

The Adapter

The adapter 26, shown in particular in FIG. 14, has the function of removably attaching the cell phone to the holder 14, and positioning it in an acquisition position allowing the lens 16 of the cell phone 12 to see the oral opening Oa through the adapter opening Oa and the acquisition opening Oa' of the spacer. Preferably, the adapter 26 is configured so that this position may be modified.

The cell phone 12 may be attached to the adapter 26 for example with one or more elastic bands, one or more hook-and-loop tapes, one or more clips, one or more screws, a flap, for example rotatably mounted on the base of the adapter and lockable in a position in which it clamps the cell phone 12, jaws, one or more suction cups or one or more magnets.

The flap may be held against the cell phone so as to hold it in position, by any means, for example by means of one or more clip(s), screw(s), hook-and-loop tape(s) of Velcro® type, elastic band(s), magnet(s), hook(s), bolt(s), strap(s), suction cup(s), in particular microsuction cup(s) or nanosuction cup(s), or an adhesive material, for example a gel.

The cell phone may also be inserted in a shell, a cover or a case, attached to the base of the adapter. The case, for example made of plastic, may be provided with a door mounted rotatably, preferably about a horizontal or vertical axis. The shape of the cover or the case is not limiting, provided that it allows the lens 16 to see outside the cover or the case and, preferably, leaves the screen visible from outside the cover or the case.

The case or the cover or the shell may for example be attached to the base by any means, for example by complementarity of shapes, or by means of one or more clip(s), screw(s), hook-and-loop tape(s) of Velcro® type, elastic band(s), magnet(s), hook(s), bolt(s), strap(s), suction cup(s), in particular microsuction cup(s) or nanosuction cup(s), or an adhesive material, for example a gel. The case or the cover may be made in one piece with the base.

In one embodiment, the adapter comprises a strap, preferably elastic, preferably made of elastomer, preferably transparent, for attaching the cell phone.

This list of examples is not limiting.

An "unobstructed" surface of the screen 20 is a surface which is not covered by the adapter 26. If part of the adapter 26 made of a transparent material, for example a transparent strap, covers a surface of the screen, this surface is not considered to be "unobstructed".

The adapter 26 is preferably configured so as, in the assembled position, to leave unobstructed more than 80%, preferably more than 90%, preferably more than 95%, preferably substantially 100% of the surface of the screen 20 of the cell phone.

The surface of the adapter 26 which is in contact with the cell phone 12 in the assembled position is referred to as the "contact surface".

Preferably, more than 70%, more than 80%, preferably more than 90%, preferably substantially 100% of the contact surface is in contact with the front face $\mathbf{12}_1$ and the side edge 22 of the cell phone, preferably the side edge 22 of the cell phone.

A portion of the contact surface may be in contact with the rear face of the cell phone, or with the screen 20. Preferably, the area of this portion of the contact surface represents less than 20%, preferably less than 10%, preferably less than 5%, preferably less than 2% of the area of said rear face, and is preferably zero. Preferably, the area of this portion of the contact surface represents less than 20%, preferably less than 10%, preferably less than 5%, preferably less than 2% of the area of said screen 20.

Preferably, the contact surface does not cross the screen 20 from one edge of the rear face $\mathbf{12}_2$ to an opposite edge of the rear face $\mathbf{12}_2$. In particular, the contact surface does not cross the screen vertically. Preferably, in the assembled position, the cell phone is not encircled by the adapter 26, as is the case when a strap or a flap bears on the rear face to press the cell phone against a receiving face of the adapter 26.

A "visible" surface of the screen 20 is a surface which is not covered by the adapter 26 or which is covered by a transparent part of the adapter, such that it is possible to see the screen through it. If part of the adapter 26 made of a transparent material, for example a transparent strap, covers a surface of the screen, this surface is thus considered to be "visible". Preferably, tactile communication with the screen is possible through said parts of the adapter 26 made of a transparent material.

A surface of the screen 20 which is not "visible" is said to be "concealed".

The adapter 26 is preferably configured so as, in the assembled position, to leave visible more than 80%, preferably more than 90%, preferably more than 95%, preferably substantially 100% of the surface of the screen 20 of the cell phone.

Advantageously, the screen 20 thus makes it possible to see the teeth perfectly. In addition, the entire touch-sensitive man-machine interface is advantageously accessible.

Also preferably, the adapter 26 is configured to allow the attachment of different cell phones, and in particular cell phones having different dimensions.

In a preferred embodiment, the cell phone 12 is held on the adapter 26 by clamping.

In particular, preferably, the adapter 26 comprises a base 50, a first jaw $52_1$ and a second jaw $52_2$, opposite the first jaw, at least the first jaw being movably mounted on the base 50 between moved-together and spaced-apart positions in which the first jaw is at minimum and maximum distances from the second jaw, respectively.

Preferably, only the first jaw is movably mounted on the base 50. The second jaw is stationary relative to the base. Advantageously, the mechanism for bringing the jaws together and then locking them in position is thereby simplified and made more compact.

The saving in terms of compactness is particularly beneficial for a kit according to the invention, which must allow the use of the lens of the cell phone positioned on the front face of the phone.

The stationary nature of the second jaw also makes it possible to position the cell phone in its permanent position before the two jaws are brought together to clamp the cell phone. The operation of attaching the cell phone is thereby considerably simplified, in particular because it is not necessary to hold the cell phone while bringing the jaws together.

This also prevents destabilization.

In the spaced-apart position, the maximum distance $d_{52}$ between the first and second jaws is preferably greater than 5 cm, preferably greater than 7 cm, preferably greater than 9 cm, and/or less than 25 cm, preferably less than 15 cm (FIG. 3).

In the moved-together position, the minimum distance $d_{52}$ between the first and second jaws is preferably greater than 2 cm, preferably greater than 3 cm, preferably greater than 5 cm, and/or less than 10 cm, preferably less than 8 cm.

The movement of the first jaw toward the second jaw, or "approach movement", results in the assembled position, generally intermediate between the moved-together and spaced-apart positions, in which the first and second jaws grip and clamp the cell phone 12, preferably by pressing on the side edge 22 of the cell phone.

The first jaw $52_1$ is preferably mounted to move in translation relative to the second jaw, in a clamping direction $Z_{52}$, preferably vertical in the service position.

Preferably, the first jaw $52_1$ is mounted so as to be elastically movable in translation relative to the second jaw $52_2$, in the clamping direction. Preferably, the adapter 26 comprises an elastically deformable member, preferably a spring 56, preferably a compression spring, arranged in such a way as to oppose a thrust of the first jaw $52_1$ toward the moved-together position.

In FIG. 4, the spring 56 is arranged in a housing of the base 50, extending vertically. It is compressed between the end wall of the housing and the first jaw $52_1$. The adapter 26 may comprise several springs 56 arranged in respective housings extending vertically and compressed between the end wall of their respective housing and the first jaw $52_1$. Advantageously, the risk of instability is reduced.

Preferably, however, the adapter 26 comprises a single spring 56, preferably a compression spring, which extends in the clamping direction, at a point halfway across the width of the first and second jaws $52_1$ and $52_2$. Compactness is advantageously thereby improved.

The second jaw $52_2$ may be movable on the base 50. However, preferably, the base 50 incorporates the second jaw, as shown in FIG. 3 (in FIG. 4, the second jaw has been removed from the base 50).

As shown in FIG. 4B, in side view, at least one of the first and second jaws, preferably each of the first and second jaws, has the shape of a trough, or "cradle shape", which extends in the direction $Y_{52}$ and which, in the assembled position, receives the cell phone 12.

Advantageously, the first and second jaws thus not only clamp the cell phone, but also retain the latter by complementarity of shapes. Holding of the cell phone 12 is thereby improved. The trough shape also promotes sliding of the cell phone between the first and second jaws, parallel to the direction $Y_{52}$. Such sliding makes it possible to position the lens 16 such that the optical axis $X_{16}$ is in the vertical plane containing the axis $X_a$ of the adapter opening.

Preferably, the base 50 comprises a receiving face 54, preferably flat, preferably vertical, on which the cell phone rests in the assembled position. This flat surface is preferably defined by a mat 58 made of elastomer. It preferably extends as far as the second jaw. Advantageously, the fact that the cell phone rests on the receiving face 54 contributes to the holding of the cell phone, in particular by limiting sliding between the first and second jaws.

Preferably, the movement of the cell phone 12 placed between the first and second jaws is not limited by any stops, which makes it possible to put in place a cell phone of any length.

Preferably, at least the first jaw $52_1$ is mounted in such a way as to be movable on the base 50 incrementally.

Preferably, the adapter 26 comprises a first deactivatable non-return system preventing a separation movement of the first jaw, that is to say a movement in the opposite direction to an approach movement. The first non-return system preferably comprises, as shown in FIGS. 4 and 5:

- a first pawl 62 mounted rotatably, about an axis $X_{62}$, on the base 50, in such a way as to be deactivatable,
- a ratchet wheel 64 mounted rotatably, about an axis $X_{64}$, on the base 50, interacting with the first pawl 62, and mechanically coupled to the first jaw $52_1$ such that rotation of the ratchet wheel 64 causes the first jaw to move parallel to the clamping direction $Z_{52}$, and
- a first spring 66 elastically pushing the first pawl 62 against the teeth of the ratchet wheel 64 in such a way as to allow rotation of the ratchet wheel 64 only in the direction of rotation that results in an approach movement.

The successive positions of the first jaw during a translational movement in the clamping direction $Z_{52}$, referred to as the "indexed positions", are marked by the elastic penetration of the first pawl 62 between the successive teeth of the ratchet wheel 64.

The coupling of the ratchet wheel 64 and the first jaw $52_1$ may be ensured by a rack and pinion assembly.

Preferably, the first jaw $52_1$ is provided with a first rack 68 extending parallel to the clamping direction and the adapter 26 comprises a stepped wheel 70 mounted rotatably, about the axis $X_{64}$, on the base 50, and comprising

- the ratchet wheel 64 and
- a pinion 72, coaxial with the ratchet wheel 64, interacting with the first rack 68 in such a way that rotation of the pinion 72 causes the first jaw to move parallel to the clamping direction.

Advantageously, such a stepped wheel is particularly compact and allows incremental and well-controlled movement of the first jaw.

The adapter 26 preferably includes a first push button 74, pressing of which causes deactivation of the first non-return system.

Preferably, the first pawl 62 is coupled to the first push button 74 in such a way that actuation of the push button (by pressing the push button) causes the first pawl 62 to disengage from the ratchet wheel. In a preferred embodiment shown in FIG. 4, the first push button 74 and the first pawl 62 are each at one end of a rocker 76 mounted rotatably about the axis $X_{62}$. Pressing the first push button 74 therefore causes a rotation of the rocker 76 and the disengagement of the first pawl 62 from the teeth of the ratchet wheel 64, that is to say deactivation of the first non-return system. When the button ceases to be pushed, this causes a rotation in the opposite direction, under the action of the first spring 66, and the engagement of the first pawl 62 between the teeth of the ratchet wheel 64.

The first non-return system thus forms a lock for selectively locking in position or allowing the movement of the first jaw $\mathbf{52_1}$ on the base 50.

As described above, preferably, the first jaw $\mathbf{52_1}$ is movably mounted on the base 50 in such a way as to move away elastically from the second jaw. Deactivation of the first non-return system therefore causes elastic return to a spaced-apart position.

Advantageously, elastic return of the first jaw $\mathbf{52_1}$ to the spaced-apart position considerably facilitates the mounting of the cell phone 12 on the adapter 26.

Preferably, at least one of the first and second jaws, preferably each of the first and second jaws, comprises a pad 78 made of elastomer which, in the assembled position, bears on the cell phone 12.

Preferably, the pad 78 is configured such that, when the first jaw is incrementally movable on the base 50 and the pad 78 begins to clamp the cell phone, elastic deformation of the pad makes it possible to reach the next indexed position. Advantageously, the clamping of the cell phone makes it possible to effectively clamp the phone, without damaging the latter. The pad 78 also helps to protect the cell phone against shocks and vibration.

Preferably, the clamping zone 71 via which the cell phone 12 is clamped by the first and second jaws is exclusively defined by pads 78.

The clamping zone 71 is made up of a set of clamping points. At each of these points, the adapter exerts a compressive force, referred to as the "clamping" force, on the cell phone 12. The greatest distance between clamping points, measured in the direction of the length $L_2$ of the cell phone, is preferably greater than 1 cm, preferably greater than 2 cm, greater than 3 cm, and/or less than 20 cm, preferably less than 10 cm, preferably less than 8 cm, preferably less than 6 cm, preferably less than 5 cm.

Preferably, at least one "basic" clamping zone (that is to say the part of the clamping zone defined by a jaw), preferably each basic clamping zone, has an overall length $L_{52}$ greater than 1 cm, preferably greater than 2 cm, greater than 3 cm, and/or less than 20 cm, preferably less than 10 cm, preferably less than 8 cm, preferably less than 6 cm, preferably less than 5 cm. "Overall length" means the greatest distance between two points in the basic clamping zone, in the direction $Y_{52}$. In particular, the overall length does not change if the basic clamping zone is locally interrupted between these two points.

In the embodiment shown in FIG. 4, the overall length $L_{52}$ is the greatest distance between clamping points.

Advantageously, the attachment of the cell phone 12 to the adapter 26 is particularly stable. The kit may thus be handled by holding the phone, which facilitates the acquisition of data through the lens 16 of the cell phone.

The basic clamping zone of the first jaw and/or of the second jaw preferably extends in the direction of the length of the cell phone.

Preferably, as shown in FIG. 6, the adapter 26 further comprises a plate 80 defining the adapter opening Oa and movably mounted on the base 50, preferably at least in translation, preferably at least parallel to a vertical sliding direction $Z_{80}$, preferably exclusively parallel to the sliding direction $Z_{80}$.

Sliding may be achieved by means of a slider, for example borne by the plate 80, mounted slidably in a rail formed in the base 50. Sliding by means of several sliders mounted slidingly in respective parallel rails may be achieved to limit the risk of instability.

Advantageously, the position of the adapter opening Oa relative to the lens 16 may thus be modified.

Preferably, the ability of the plate 80 to move on the base 50 is independent of the ability of the first jaw to move on the base 50, and more generally independent of the position of the cell phone 12 on the adapter 26.

The cell phone 12 is rigidly attached to the plate 80 by clamping, removably, between the first and second jaws.

The position of the cell phone 12 relative to the adapter opening Oa may therefore be adjusted independently, horizontally by sliding between the first and second jaws, and vertically by sliding the plate 80 on the base 50, until the lens 16 is positioned opposite the adapter opening Oa, preferably substantially at the center of the adapter opening Oa.

The adapter opening Oa is preferably of a size such that, at least in this centered position of the lens 16, the flash 18 faces the adapter opening Oa. Advantageously, the flash 18 may thus illuminate the teeth during the acquisition of 2D or 3D data by the cell phone 12.

The plate 80 is preferably mounted in such a way as to be movable on the base 50 incrementally. In other words, at least in one direction, it may be moved in increments, preferably in constant increments. Advantageously, the adjustment of the position of the adapter opening Oa relative to the cell phone is thereby facilitated.

Preferably, the adapter 26 includes a deactivatable lock for selectively locking the plate 80 in position relative to the base 50.

Preferably, the base 50 comprises a second rack 82 and the plate 80 comprises

- a second pawl 84 mounted rotatably, about an axis $X_{84}$, on the plate 80, in such a way as to interact with the teeth of the second rack 82,
- a second spring 86 elastically pushing the second pawl 84 against the teeth of the second rack 82 in such a way as to define indexed positions for positioning the plate 80 along the second rack 82. These successive indexed positions are marked by the elastic penetration of the second pawl 84 between the successive teeth of the second rack 82.

Preferably, the second rack 82 and the second pawl 84 are shaped in such a way as to allow the plate 80 to move in translation in one direction only, namely, in FIGS. 6 and 7, the upward direction.

The second rack 82 and the second pawl 84 thus define a second deactivatable non-return system preventing a return movement, in this case a downward movement, of the plate 80 with respect to the base 50.

The adapter 26 preferably includes a second push button 94, pressing of which causes deactivation of the second non-return system.

Preferably, the second pawl 84 is coupled to the second push button 94 in such a way that actuation (by pressing the second push button 94) causes the second pawl 84 to disengage from the second rack 82. In a preferred embodiment shown in FIGS. 6 and 7, the second push button 94 and the second pawl 84 are each at one end of a rocker 96 mounted rotatably about the axis $X_{84}$. Pressing the second push button 94 therefore causes a rotation of the rocker 96 and the disengagement of the second pawl 84 from the teeth of the second rack 82, that is to say deactivation of the second non-return system. When the button ceases to be pushed, this causes a rotation in the opposite direction, under the action of the second spring 86, and the engagement of the second pawl 84 between the teeth of the second rack 82.

The second non-return system thus forms a lock for selectively locking in position or allowing the movement of the plate 80 on the base 50.

Of course, in an equivalent manner, the second rack 82 could be on the plate 80 and the second pawl 84 mounted on the base 50.

In a preferred embodiment, a reference mark, made on the adapter, indicates possible positions of the cell phone 12 with respect to the base 50 and/or of the plate 80 with respect to the base 50, for example depending on the type or brand of the cell phone. The reference mark may for example be an arrow associated with a brand of cell phone.

Preferably, the plate 80 includes a first reference mark and the base includes one or more second reference marks opposite which the first reference mark may be positioned, or, equivalently, the base 50 includes a first reference mark and the plate 80 includes one or more second reference marks opposite which the first reference mark may be positioned. Preferably, the second reference marks correspond to cell phone brands. In other words, to correctly position a cell phone on the holder, all that is required is to position the first reference mark opposite the second reference mark corresponding to the brand of this cell phone.

Preferably, the acquisition opening Oa' is laterally offset with respect to the clamping zone in which the cell phone 12 is clamped to the adapter 26, as shown in FIG. 6B.

The lateral offset is determined by looking at the adapter 26 from the front, that is to say parallel to the axis of the acquisition opening Oa' (FIG. 6B). In FIG. 6B, the vertical planes $P_1$ and $P_2$ delimit the clamping zone.

The offset direction Y is the horizontal direction, parallel to the plane of the front face of the cell phone.

In the offset direction Y, the positions $p_{a'}$ and $p_s$ of the center Ca' of the acquisition opening Oa' and the center Cs of the clamping zone, respectively, may be identified. The lateral offset is measured by the distance $d_l$, in the offset direction Y (FIG. 6B).

Preferably, the lateral offset is constant.

Preferably, the lateral offset is greater than 1 cm, preferably greater than 1 cm, preferably greater than 3 cm, or even greater than 4 cm, or greater than 5 cm, and/or less than 10 cm.

Advantageously, the lateral offset allows the acquisition opening Oa' to be positioned facing the lens 16 and allows the cell phone to be firmly attached to the adapter 26 even if the lens 16 is very close to an edge of the front face. This attachment is particularly effective because the clamping zone may be substantially halfway along the length of the cell phone 12 while the acquisition opening or the adapter opening is close to the lateral edge of the cell phone 12.

In one embodiment, the cell phone is clamped via its two large sides and held horizontally for the acquisition of images or 3D models, as shown in FIG. 6. In this preferred embodiment, the lateral offset not only balances the kit, with clamping preferably substantially halfway along the length, but also facilitates access to the buttons of the cell phone which, in the direction of the length of the cell phone, are in the region of the lens 16, that is to say in the upper part of the cell phone.

Operation

The way in which the kit operates ensues directly from the preceding description.

Initially, the kit is in the disassembled position. Where applicable, the user selects a spacer 24 from among several spacers, according to the personalization mark 39.

The user clips the spacer 24 onto the adapter 26, inserting the end of the spacer 24 opposite the oral opening Oa into the housing of complementary shape defined by the adapter.

Clipping is achieved by hooking the claws of the adapter in the recesses made on the outer surface of the spacer 24.

After clipping, the spacer extends substantially up to the adapter opening Oa defined by this housing. It thus defines a lining which limits contact between the wall defining this housing and the air breathed when in the service position.

If the first and second jaws are too close to one another to put the cell phone in place, the user presses the first push button 74 to disengage the first pawl 62 from the ratchet wheel 64. Under the action of the compression spring 56, the first jaw $\mathbf{52}_1$ moves away from the second jaw and reaches the spaced-apart position. The user then stops pressing the first push button 74.

The distance $d_{52}$ between the first and second jaws is thus greater than the width of the cell phone 12. The user then places the cell phone 12 on the mat 58, resting on the second jaw $\mathbf{52}_2$, then moves it laterally, along the second jaw, until the adapter opening Oa is substantially in line with the lens 16, that is to say above or below the lens 16. The lateral offset of the first and second jaws relative to the adapter opening makes it possible to achieve this position without substantially shifting clamping away from the middle of the length of the cell phone.

Next, the user pushes the first jaw back until it comes into contact with the side edge of the cell phone, so as to grip it with the second jaw.

As the jaws thus move toward one another, the first rack 68 drives the pinion 72, and therefore the stepped wheel 70 and the ratchet wheel 64. The first pawl 62, pushed by the first spring 66, engages the ratchet wheel 64 and prevents any separation movement of the first and second jaws. It also allows incremental movement of the first jaw, in other words movement "in increments".

When the first jaw comes into contact with the side edge of the cell phone, the reaction of the cell phone opposes continuation of the approach movement. The deformation of the pads 78, however, allows the first jaw to be pushed at least to the next notch (the first pawl 62 engaging with the next tooth on the ratchet wheel).

The cell phone 12 is thus rigidly attached to the base 50, clamped between the first and second jaws. The screen 20 is completely unobstructed.

The user then adjusts the vertical position of the plate 80 on the base 50, such that the adapter opening is substantially opposite the lens 16.

In the embodiment of FIGS. 6 and 7, the second pawl 84, pushed by the second spring 86, engages the teeth of the second rack 82 and prevents any downward movement of the plate 80. It allows incremental movement of the plate 80.

If the plate 80 is too high, the user presses the second push button 94 to disengage the second pawl 84 from the second rack 82. They may then lower the plate 80. As soon as the user releases the second push button 94, the pawl again engages the second rack 82, under the action of the second spring 86.

Once the adapter opening Oa is substantially opposite the lens 16, and preferably the flash, the kit, in the acquisition position, is ready for use.

The user then activates the cell phone so that it may be used to acquire images or 3D models. They may advantageously use the screen 20, which is completely unobstructed.

The user then inserts the distal flange 46 between their lips and their teeth and positions the oral opening facing the teeth for which they want to acquire data, preferably take photos or acquire a scan. The user is thus in a service position. By pressing the shutter release on the cell phone, the user acquires this data.

The user then moves the oral opening to acquire data for other teeth.

The spacer does not prevent the user's jaws from moving closer together or apart. It thus allows the acquisition in particular of photos showing the teeth of the user, while the user has their mouth open or their mouth closed, keeping the lips pushed back.

By pivoting the kit about themselves, the user allows the cell phone to see different regions of their mouth, for example to take photos of the dental arch or the teeth at the back of the mouth.

Preferably, the user acquires 2D or 3D data in at least a front view, a right-hand view and a left-hand view. Preferably, the user acquires 2D or 3D data in at least one mouth open view and at least one mouth closed view, preferably each time in front, right-hand and left-hand views.

The user then takes the spacer 24 from their mouth, and removes the cell phone. To this end, all that is required is to press the first push button 74 to disengage the first pawl 62 from the ratchet wheel 64. Under the action of the spring 56, the first jaw $\mathbf{52_1}$ moves away from the second jaw and reaches the spaced-apart position, making it possible to take out the cell phone 12.

The user may then analyze the data acquired and/or transmit same using the cell phone 12.

Lastly, the user separates the spacer 24 from the adapter 26 by pulling hard enough on the spacer to disengage the claws 38.

Generally, only the spacer needs to be cleaned, or sterilized. Advantageously, it does not include any moving part the operation of which might be affected by these operations.

It also does not have any re-entrant corner edges likely to trap dirt. Cleaning or sterilization is therefore more effective.

Naturally, the order of the operations may be changed. For example, the user may attach the spacer to the adapter before or after attaching the cell phone. The spacer may be removed before or after the cell phone.

As is now clear, the invention considerably facilitates the acquisition of photos or 3D models, including showing the vestibular surfaces of molars, in particular for the implementation of the method described in PCT/EP2015/074896. It allows rapid acquisition, in extremely hygienic conditions, typically in less than a minute, without the need for specialized personnel, specifically a dentist or an orthodontist. The acquisition may in particular be carried out by the user themselves or by a friend or relative, simply using a cell phone, anywhere, and in particular without visiting a medical, dental or orthodontal practice. In addition, acquisition is possible without the use of a tool that rests on the ground to immobilize the cell phone, specifically without a tripod.

Lastly, the kit allows the cell phone to be attached quickly and reliably, whatever its thickness, without the risk of damaging it.

Naturally, the invention is not limited to the embodiments described and illustrated, which are provided purely for illustrative purposes.

In particular, the shape of the spacer is not limiting.

The second jaw may be movable, and optionally mounted on the base like the first jaw.

In one embodiment, the first jaw $\mathbf{52_1}$ is movably mounted on the base 50 in such a way as to elastically approach the second jaw. The first non-return system may then be designed to prevent this approach, its deactivation causing elastic return to a moved-together position.

The invention claimed is:

1. An acquisition kit comprising:

a cell phone having
- a front face,
- a rear face with a screen, and
- a side edge, defining the thickness of the cell phone and connecting the front and rear faces;
- the cell phone being provided with a 2D and/or 3D data acquisition lens;

a cell phone holder comprising
- a spacer, opening out through an oral opening intended to be inserted in the mouth of the user and through an acquisition opening, and
- an adapter attached to the spacer and defining with the spacer a chamber opening out through the oral opening and through an adapter opening, the adapter comprising a base to which the cell phone is rigidly attached, preferably removably, in an acquisition position in which the lens has an at least partial view of the oral opening, through the adapter opening and the acquisition opening, the spacer having a body of generally tubular shape, defining the oral opening and a distal flange extending outward from the body and shaped so as to be inserted between the user's lips and teeth, the oral opening extending partially outside the plane passing through its center and perpendicular to the axis connecting the center of the oral opening and the center of the acquisition opening, the oral opening having a curvature about a vertical axis in the service position, the radius of said curvature being greater than 20 mm and less than 80 mm.

2. The acquisition kit as claimed in claim 1, wherein the distal flange has a lateral end separated from said plane by a distance of greater than 5 mm and less than 12 mm.

3. The acquisition kit as claimed in claim 1, wherein said radius of said curvature of the oral opening is greater than 40 mm and less than 60 mm.

4. The acquisition kit as claimed in claim 1, wherein the oral opening has a curvature exclusively about said vertical axis.

5. The acquisition kit as claimed in claim 1, wherein the ratio between the distance between the lateral ends of the distal flange and said distance between said lateral ends and said plane is between 5 and 8.

6. The acquisition kit as claimed in claim 1, wherein the distal flange lies in the extension of the oral opening.

7. The acquisition kit as claimed in claim 1, wherein the outer surface of the spacer has, at any point in the transition zone between the distal flange and the body, a radius of curvature at said point of greater than 1 mm.

8. The acquisition kit as claimed in claim 7, wherein the radius of curvature at said point is greater than 1.5 mm.

9. The acquisition kit as claimed in claim 8, wherein the radius of curvature at said point is greater than 3 mm.

10. The acquisition kit as claimed in claim 1, wherein the distal flange has, continuously and over a length of greater than 10 mm, a height of less than 3 mm.

11. The acquisition kit as claimed in claim 10, wherein the region in which the distal flange has, continuously and over a length of greater than 10 mm, a height of less than 3 mm is centered on a labial frenulum in the service position, when the user is holding the acquisition kit in front of them.

12. The acquisition kit as claimed in claim 1, wherein the distal flange has a maximum height of greater than 3 mm and less than 8 mm.

13. The acquisition kit as claimed in claim 1, wherein the chamber comprises a divergent segment ending at the oral opening, said divergent segment being defined by a wall having a constant thickness.

14. The acquisition kit as claimed in claim 1, wherein the adapter is removably attached to the spacer.

15. A method for acquiring 2D or 3D data by means of an acquisition kit according to claim 1, said method comprising the following steps:

b) assembly of the acquisition kit, in particular by attaching the cell phone to the adapter, and optionally the spacer to the adapter;

c) insertion, by the user, of the end of the spacer defining the oral opening into the mouth of the user;

d) positioning, by the user, of the oral opening opposite teeth for which said data are to be acquired;

e) activation of the cell phone in such a way as to acquire said 2D or 3D data;

f) modification of the position of the oral opening, then return to step e).

16. The method as claimed in claim 15, comprising before the step b), the following step a): selection, by the user, of a spacer from a set of available spacers.

17. The method as claimed in claim 16, wherein at step a) the selection is made on the basis of personalization marks borne by said available spacers and/or the morphology of the user.

18. The method as claimed in claim 15, wherein at step c), the insertion is made by inserting the flange of the spacer between their lips and their teeth.

19. The method as claimed in claim 15, wherein at step f) the modification is made by rotation about the user.

* * * * *